(12) United States Patent
Sutton et al.

(10) Patent No.: US 12,482,182 B2
(45) Date of Patent: Nov. 25, 2025

(54) AUTOMATIC SEGMENTATION AND MULTIMODAL IMAGE FUSION FOR STEREOELECTROENCEPHALOGRAPHIC (SEEG) ANALYSIS IN VIRTUAL REALITY (SAVR)

(71) Applicants: THE BOARD OF TRUSTEES OF THE UNIVERSITY OF ILLINOIS, Urbana, IL (US); OSF HEALTHCARE SYSTEM, Peoria, IL (US)

(72) Inventors: Bradley P. Sutton, Savoy, IL (US); Matthew Bramlet, Peoria, IL (US); Yogatheesan Varatharajah, Minneapolis, MN (US); James Evans, Urbana, IL (US); Andres Maldonado, Peoria, IL (US); Michael Xu, Rancho Cucamonga, CA (US); Nathan Soria, Peoria, IL (US)

(73) Assignees: OSF Healthcare System, Peoria, IL (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 182 days.

(21) Appl. No.: 18/524,909

(22) Filed: Nov. 30, 2023

(65) Prior Publication Data

US 2024/0185517 A1 Jun. 6, 2024

Related U.S. Application Data

(60) Provisional application No. 63/385,708, filed on Dec. 1, 2022.

(51) Int. Cl.
 G06T 17/00 (2006.01)
 A61B 5/00 (2006.01)
 (Continued)

(52) U.S. Cl.
 CPC .............. *G06T 17/00* (2013.01); *A61B 5/291* (2021.01); *A61B 5/4094* (2013.01); *A61B 34/10* (2016.02);
 (Continued)

(58) Field of Classification Search
 None
 See application file for complete search history.

(56) References Cited

U.S. PATENT DOCUMENTS 10,588,561 B1 3/2020 Vale et al.
10,600,184 B2 3/2020 Golden et al.
(Continued)

FOREIGN PATENT DOCUMENTS

EP 2979249 B1 * 3/2017 ............... G06T 7/11
WO 2021242693 A1 12/2021

OTHER PUBLICATIONS

"FreeSurfer Analysis Pipeline Overview", Free Surfer Wiki; https://surfer.nmr.mgh.harvard.edu/fswiki/FreeSurferAnalysisPipelineOverview, last edited Apr. 14, 2017, 7 pages.

(Continued)

*Primary Examiner* — Tapas Mazumder
(74) *Attorney, Agent, or Firm* — Guntin & Gust, PLC; Kenneth S. Kwan

(57) ABSTRACT

Aspects of the subject disclosure may include, for example, co-registering MRI data with CT data to derive merged data, the MRI data and the CT data being associated with an anatomical part of a patient, the MRI data being obtained prior to implantation of a plurality of electrodes into the anatomical part and the CT data being obtained after the implantation of the plurality of electrodes, performing segmentation on the merged data to identify locations of the plurality of electrodes, resulting in identified locations,
(Continued)

localizing a region of interest in the merged data based on the identified locations of the plurality of electrodes and based on activity recordings relating to the anatomical part, and generating a model of the anatomical part by performing multimodal image fusion of the activity recordings and the merged data to derive an output for VR viewing or manipulation. Additional embodiments are disclosed.

20 Claims, 21 Drawing Sheets

(51) Int. Cl.
| | |
|---|---|
| *A61B 5/291* | (2021.01) |
| *A61B 34/10* | (2016.01) |
| *A61B 90/00* | (2016.01) |
| *G06T 7/11* | (2017.01) |
| *G06T 7/136* | (2017.01) |
| *G06T 7/30* | (2017.01) |
| *G06T 7/70* | (2017.01) |
| *G06T 19/00* | (2011.01) |

(52) U.S. Cl.
CPC ............... *A61B 90/37* (2016.02); *G06T 7/11* (2017.01); *G06T 7/136* (2017.01); *G06T 7/30* (2017.01); *G06T 7/70* (2017.01); *G06T 19/00* (2013.01); *A61B 2034/105* (2016.02); *G06T 2200/24* (2013.01); *G06T 2207/10081* (2013.01); *G06T 2207/10088* (2013.01); *G06T 2207/20221* (2013.01); *G06T 2207/30016* (2013.01); *G06T 2210/41* (2013.01); *G06T 2219/004* (2013.01)

(56) References Cited

U.S. PATENT DOCUMENTS

| | | | |
|---|---|---|---|
| 11,423,603 | B2 | 8/2022 | Sutton et al. |
| 2016/0120457 | A1 | 5/2016 | Wu et al. |
| 2020/0093566 | A1* | 3/2020 | Cadwell ................. A61B 5/296 |
| 2020/0178832 | A1 | 6/2020 | Berry et al. |
| 2021/0125707 | A1 | 4/2021 | Rusko et al. |
| 2022/0061735 | A1 | 3/2022 | Jeyanandarajan |

OTHER PUBLICATIONS

Bartolomei, Fabrice , "Epileptogenicity of brain structures in human temporal lobe epilepsy: a quantified study from intracerebral EEG", Brain (2008), 131, 1818-1830, 2008, 13 pages.

Bru-Luna, Lluna Maria, et al., "Emotional Intelligence Measures: A Systematic Review", Healthcare 2021, 9, 1696, 2021, 36 pages.

Cai, Fang , et al., "BrainQuake: An Open-Source Python Toolbox for the Stereoelectroencephalography Spatiotemporal Analysis", Frontiers in Neuroinformatics, vol. 15, Article 773890, Jan. 7, 2022, 15 pages.

Dale, Anders M., et al., "Cortical Surface-Based Analysis", NeuroImage 9, 179-194 (1999), 16 pages.

Dubarry, A. Sophie, et al., "An open-source toolbox for Multi-patient Intracranial EEG Analysis (MIA)", NeuroImage 257 (2022) 119251, 14 pages.

Gramfort, Alexandre , et al., "MEG and EEG data analysis with MNE-Python", Frontiers in Neuorscience, vol. 7, Article 267, Dec. 26, 2013.

Huang, Harvey , et al., "A canonical visualization tool for SEEG electrodes", Annu Int Conf IEEE Eng Med Biol Soc. Nov. 2021: 6175-6178; doi:10.1109/EMBC46164.2021.9630724, 12 pages.

Isnard, Jean , et al., "French guidelines on stereoelectroencephalography (SEEG)", Neurophysiologie Clinique/ Clinical Neurophysiology (2018) 48, 5-13, 2018, 9 pages.

Jenkinson, Mark , et al., "A global optimisation method for robust affine registration of brain images", Medical Image Analysis 5 (2001) 143-156, 14 pages.

Lewiner, Thomas , et al., "Efficient implementation of Marching Cubes' cases with topological guarantees", Journal of Graphics Tools, vol. 8, No. 2, pp. 1-15. ACM Press, 2003, 8 pages.

Makhalova, Julia , et al., "Virtual epileptic patient brain modeling: Relationships with seizure onset and surgical outcome", Epilepsia 2022; 63:1942-1955, May 20, 14 pages.

Narizzano, Massimo , et al., "SEEG assistant: a 3DSlicer extension to support epilepsy surgery", BMC Bioinformatics (2017) 18:124; DOI 10.1186/s12859-017-1545-8, 2017, 13 pages.

Sindhu, Kavyakantha Remakanthakurup, et al., "Trends in the use of automated algorithms for the detection of high-frequency oscillations associated with human epilepsy", Epilepsia, 2020; 61: 1533-1569;, Jun. 29, 2020, 17 pages.

Smith, Stephen M., "Fast Robust Automated Brain Extraction", Human Brain Mapping 17:143-155, 2002, 13 pages.

Tadel, Francois , et al., "Brainstorm: A User-Friendly Application forMEG/EEG Analysis", Computational Intelligence and Neuroscience, vol. 2011, Article ID 879716, 2011, 14 pages.

Thijs, Roland D., et al., "Epilepsy in adults", www.thelancet.com vol. 393, Feb. 16, 2019, 13 pages.

Tian, Niu , et al., "Active Epilepsy and Seizure Control in Adults—United States, 2013 and 2015", Centers for Disease Control and Prevention; Morbidity and Mortality Weekly Report (MMWR); vol. 67, No. 15, Apr. 20, 2018, 6 pages.

Van Der Walt, Stefan , et al., "scikit-image: image processing in Python", PeerJ, DOI 10.7717/peerj.453, 2014, 18 pages.

Villalon, S. Medina, et al., "EpiTools, A software suite for presurgical brain mapping in epilepsy: Intracerebral EEG", Journal of Neuroscience Methods 303 (2018) 7-15, 2018, 9 pages.

* cited by examiner

*prior to seizure*

AUTOMATIC SEGMENTATION AND MULTIMODAL IMAGE FUSION FOR STEREOELECTROENCEPHALOGRAPHIC (SEEG) ANALYSIS IN VIRTUAL REALITY (SAVR)

CROSS-REFERENCE TO RELATED APPLICATION

This application claims the benefit of and priority to U.S. Provisional Ser. No. 63/385,708, filed Dec. 1, 2022. The contents of the foregoing are hereby incorporated by reference into this application as if set forth herein in full.

FIELD OF THE DISCLOSURE

The subject disclosure generally relates to automatic segmentation and multimodal image fusion for stereoelectroencephalographic (SEEG) analysis in virtual reality (SAVR).

BACKGROUND

Epilepsy is the third most common chronic brain disorder and affects over 70 million people worldwide, where about a third of the cases are drug-resistant. Patients are generally at a high risk for premature death or long-term serious adverse effects. For instance, over 3.4 million people have epilepsy nationwide (~1% of the population) with approximately 470,000 being children, where more than 30% of those patients are not fully controlled by the currently available antiepileptic drugs. For these patients, an effective treatment is surgical resection of the seizure onset zone (SOZ). Resective surgery can have significant positive outcomes, including being seizure free in a few months and seeing improvements in other quality of life measures. For instance, in one study at a single clinical site, 77% of children who underwent resective surgery were seizure free at 12 months.

BRIEF DESCRIPTION OF THE DRAWINGS

Reference will now be made to the accompanying drawings, which are not necessarily drawn to scale, and wherein.

DETAILED DESCRIPTION

Figure 1A:
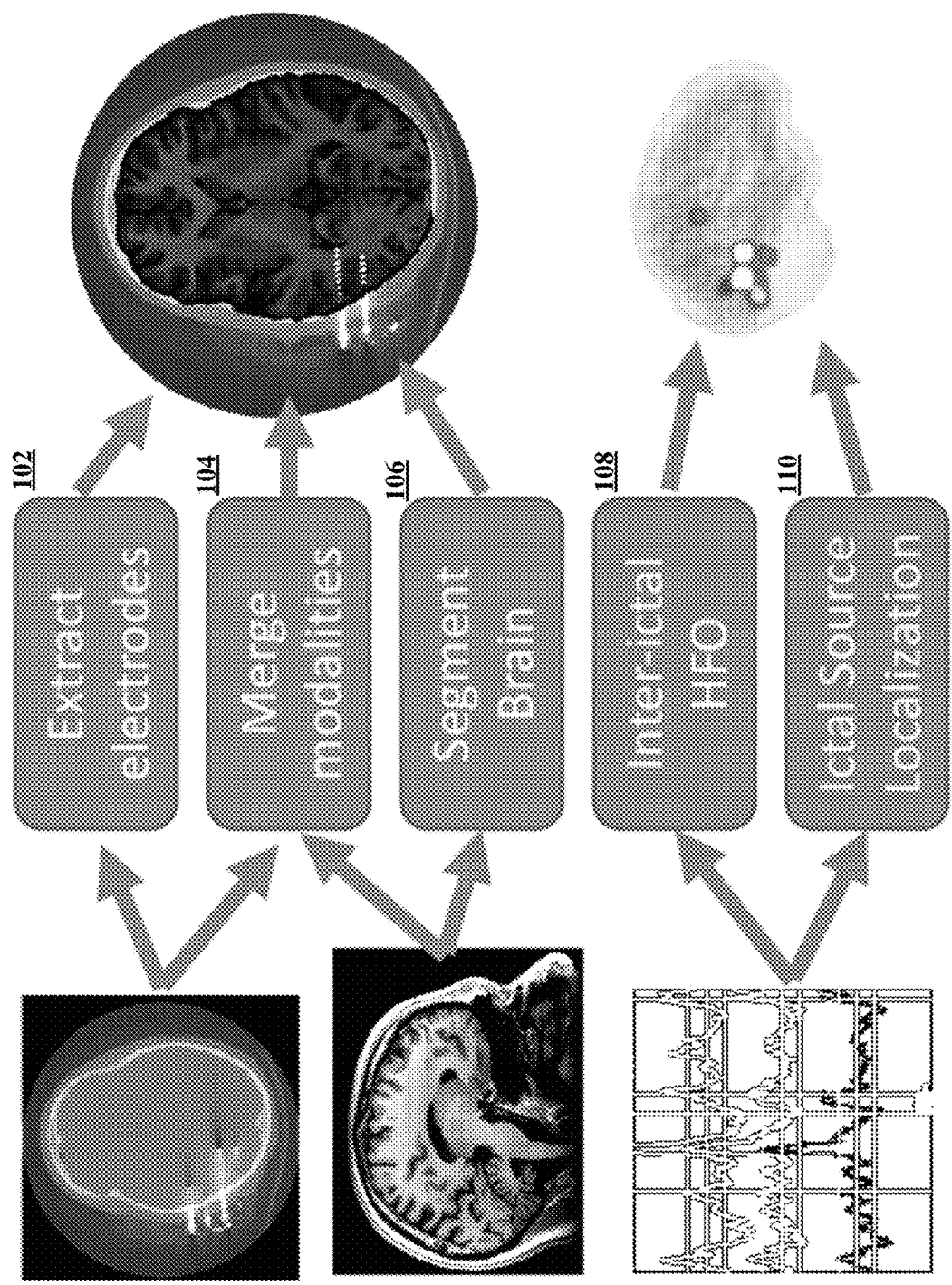
FIG. 1A shows example, non-limiting functions of a multimodal image fusion-capable visualization platform for presurgical planning, in accordance with various aspects described herein.

To find the location of an SOZ, especially if it is deep in the brain or difficult to localize, a surgeon may implant electrodes into a patient's brain through a procedure called stereoelectroencephalography (SEEG). SEEG electrodes are increasingly used to localize SOZs in patients with drug-resistant epilepsy (DRE) prior to resective surgery. Clinical workup for a patient affected by epilepsy typically includes pre-operative magnetic resonance imaging (MRI) scan(s) (pre-implantation of electrodes) (which indicate the general anatomical structure of tissues, such as where gray matter and white matter are), post-implantation computerized tomography (CT) scan(s) (which indicate electrode locations), as well as SEEG electrode recordings. SEEG electrodes record electrical activity from highly localized regions inside of the brain and the locations of the activity can be visible from a CT scan taken post-implantation. From there, the surgeon must manually identify the electrodes that are near tissues which are contributing to seizures and plan a surgery to remove the tissues. Performing this manual SOZ localization is time consuming, challenging, and the two-dimensional (2D) nature of the data makes it difficult to visualize the broader context of the electrode locations as they relate to the brain tissue. It is believed that there are presently no tools available for automatically extracting electrode locations and merging them with MRI and/or CT information to enable complete viewing of the surgical case in virtual reality (VR).

The subject disclosure describes, among other things, illustrative embodiments of an interactive (e.g., automated or semi-automated VR) platform that is capable of performing patient-customized, multimodal clinical data fusion and visualization for presurgical planning, such as that for resective surgery in epilepsy. In exemplary embodiments, the platform may be configured to merge MRI and CT information with SEEG activity, perform segmentation (e.g., via extraction of imaging features and identification of electrode locations) and localize SOZ(s), and provide a (e.g., complete) representation or a VR object of a patient's anatomy in three-dimensional (3D) anatomical space or four-dimensional (4D) space (or 4D spacetime). In one or more embodiments, the platform may be configured to automatically extract SEEG-recorded ictal and interictal epileptiform activity and provide a visualization of such activity in 3D and/or 4D space. In some embodiments, other data (e.g., relating to gray matter, white matter, blood vessels, fiber tracks (from diffusion tensor imaging (DTI) or the like), etc., as described in more detail below) may be overlaid to enable user interpretation of the different imaging studies all in the same interactive model in VR.

Presently, a surgeon may analyze MRI and CT data and perform manual segmentation to arrive at a (e.g., mental) 3D model out of 2D images. The surgeon may then go by this mental model to perform the surgery. By leveraging standard medical data (i.e., images and EEG data) and merging/ converting this data into a "digital patient" that can be viewed/manipulated in VR by a surgeon, embodiments described herein can advantageously improve the surgeon's overall understanding of the procedure that needs to be performed, thereby allowing the surgeon to focus their attention on details directly relevant to the surgery.

The VR nature of the multimodal image fusion, described herein, allows for precise, patient-specific viewing of seizure data for neurosurgeons in presurgical planning for resection surgery. The ability to fuse or merge multimodal imaging data into an actionable and interpretable 3D (or 4D with activity) object enables surgeons to integrate various aspects of a patient's anatomy and function from this presurgical data and automatically view/manipulate the object (in VR) as well as visualize the 4D propagation of a seizure through the brain, all with minimal to no manual intervention. This improves spatial understanding during presurgical planning and increases clinician confidence in the surgical excision zone, thereby enhancing medical decision making in complex cases. This saves highly-trained medical professionals valuable time. Providing a platform for fusing multimodal imaging data into an actionable and interpretable 3D (or 4D with activity) object, as described herein, can drastically increase the number of patients who can gain access to surgical procedures. The improved visualization, provided by embodiments described herein, may also allow surgeons to rely less on epileptologists' interpretation of SEEG data. Indeed, neurosurgeons conventionally rely upon the scarce resource of epileptologists for interpretations of SEEG data to determine where to perform seizure foci surgical excision. Automating this entire process, as described herein, can resolve the discrepancy between epileptologist's availability and the availability of neurosurgeons to perform the surgery.

Various embodiments described herein can be combined with other VR surgical visualizations to create a brain visualization ecosystem. Different data for different neurological procedures may be inputted to a centralized platform for processing and creation of VR models for the surgical team.

Other aiding tools exist, but 1) the information is often fragmented, 2) they require technical knowledge to set up and to operate, and/or 3) they are limited to 2D image outputs. Brainquake is an existing tool that splits into two components: client and server. The server aligns MRI and CT files, segments electrodes, and sends results to the client. From there, a user can use the client to process SEEG data and identify the electrodes which contribute to the SOZ. Since the tool is split into pieces, a user of the software needs to either 1) have the technical knowledge to setup and run a local server or 2) send their MRI and CT files to the Brainquake server (which is located in China). There could be instances where, due to funding sources, data cannot be sent to a foreign country. Brainquake also does not export data that can be viewed by industry standard medical image viewing platforms or VR.

EpiTools is a pair of existing tools that work together to automatically segment electrodes and show SEEG data. The first is a segmentation tool, named GARDEL, which aligns CT and MRI data. GARDEL also allows the user to name the electrodes manually or by using a brain atlas. Additionally, GARDEL has functionality to add or remove improperly segmented electrodes and view the segmented electrodes on a model of the patient's brain. The visualization tool can dynamically manipulate the thresholds used to determine which electrodes have high seizure activity. Electrodes with high activity are displayed in the viewer as larger circles to indicate the intensity of signal. A major limitation of this software is that it only saves the visualizations as JPEGs. This means that the models cannot be interacted with once saved and cannot be used with other 3D or VR visualization tools.

SEEGAssistant is an existing extension to an industry standard medical image viewer 3D Slicer. It consists of three modules which 1) localize electrode contact locations, 2) determine the most likely cerebral location of the seizure activity, and 3) compute whether the contact is in gray matter or white matter. While quick to use, it is limited by the 3D Slicer viewer in which the brain is only viewed in a series of 2D slices. In short, currently available tools present models in a 2D format, which requires the surgeon to mentally reconstruct the data.

FIG. 1A shows example, non-limiting functions of a multimodal image fusion-capable visualization platform 100 for presurgical planning, in accordance with various aspects described herein. In exemplary embodiments, the visualization platform 100 may be implemented in hardware and/or software (e.g., in Python and/or any other language), and may include one or more tools (e.g., algorithms) configured to perform one or more of the functions.

In the case of an epilepsy patient, an MRI scan of the patient's brain may be made, SEEG electrodes may then be implanted into different regions of the patient's brain for recording brain activity, and a post-implantation CT scan of the brain may be taken. In various embodiments, the visualization platform 100 may be capable of inputting and co-registering/merging MRI image(s) with CT image(s) and performing filtering of co-registered images. A CT scan is mostly dark across the image, but reveals bright spots or streaks where there's metal, such as a SEEG electrode. A SEEG electrode may be associated with different recording locations of the electrode that record data to different channels. Thus, a SEEG electrode may have different recording locations that are relatively positioned along the electrode. In exemplary embodiments, the visualization platform 100 may employ one or more image processing algorithms that are configured to "extract" or segment (102) SEEG electrodes of the electrodes in a CT scan. In one or more embodiments, the algorithm(s) may be configured to recursively identify/locate the positions of the electrodes—e.g., by isolating contacts of the electrodes—in a patient's brain.

The algorithm(s) may perform thresholding and/or image erosion as part of segmenting SEEG electrodes. Thresholding may involve identifying a streak (e.g., where the intensity of one or more pixels/voxels satisfies a threshold value). A local neighborhood of the streak, which may correspond to a recording location of an electrode, may be identified by iteratively identifying relevant pixels/voxels that satisfy the threshold value. This may be repeated (e.g., based on prior knowledge of the exact/approximate shape and/or size of the electrode) until a recording location (and its center point and/or orientation) is fully identified. All recording locations of a given electrode may be similarly identified until there are no more relevant pixels/voxels at either end. The thresholding may be performed until all electrodes are identified in this manner. In various embodiments, each identified electrode may be "replaced" or represented by a clean, synthetic electrode object. Synthetic electrodes may be of a uniform shape/size, which can help illustrate the various recording locations of each electrode in a fairly uniform manner.

In this way, the visualization platform 100 may automatically group recording locations to a corresponding electrode, thus permitting data recorded at a given recording location to be associated with the appropriate electrode.

Figure 1B:
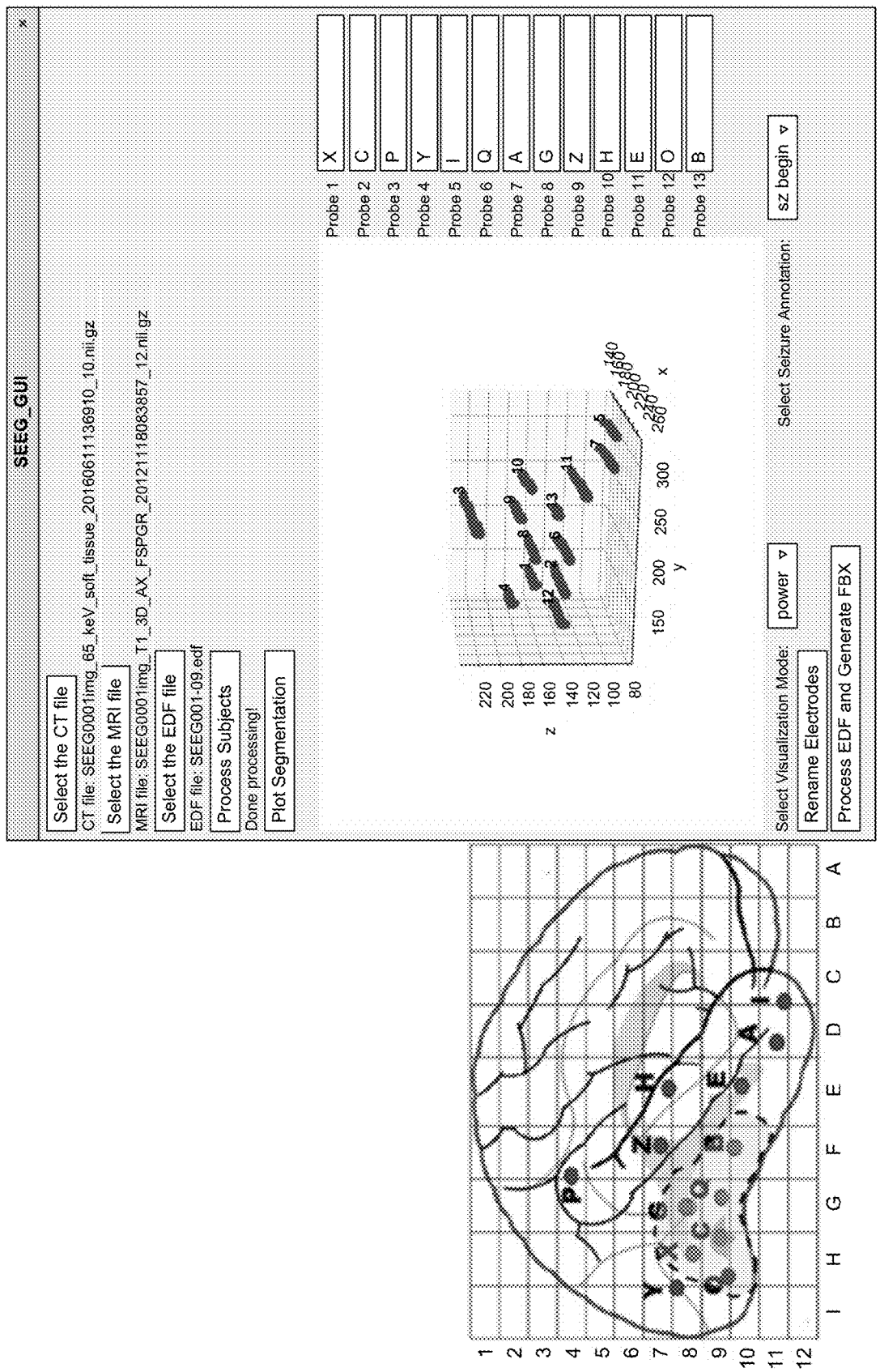
FIG. 1B shows how identified electrodes may be named or labeled, in accordance with various aspects described herein.

In various embodiments, the visualization platform 100 may facilitate labeling or naming of identified electrodes. In practice, a clinician may obtain a diagram of electrodes in a patient's brain, such as that shown in FIG. 1B, where electrodes may be labeled in a certain manner (e.g., A, B, C, P, etc.). In order to perform "correspondence" between the labels in the diagram and the electrodes identified by the visualization platform 100, the visualization platform 100 may prompt or enable a user to input names for the electrodes identified by the visualization platform 100. This (e.g., manual) naming of identified electrodes allows for matching up of electrodes with electrophysiology recordings. In this way, EEG data recorded by an electrode labeled "A" in the diagram may be mapped to, or otherwise associated with, the appropriate identified electrode in the visualization platform 100. In some embodiments, and as shown in FIG. 1B, naming of electrodes may be performed via a graphical user interface (GUI). In these embodiments, clicking or selection of an electrode, for instance, may enable the user to change the name thereof to reflect the user's preferred clinical naming scheme. It is to be understood and appreciated that, in cases where labeling of electrodes in a diagram is standardized, the visualization platform 100 may utilize the standardization to automatically and properly label the electrodes identified by the visualization platform 100.

In one or more embodiments, the visualization platform 100 may include one or more algorithms that are configured to merge (104) MRI and CT data to bring or translate electrode locations into a particular space (e.g., the MRI space or the CT space, as desired). More particularly, above-described steps may result in identified volumes of electrodes, which need to be aligned to a common space. In some embodiments, the algorithm(s) may apply rigid body registration (rotations/translations) to ensure that the volumes of the electrodes are all aligned in the common space.

In certain embodiments, the visualization platform 100 may include one or more algorithms that are configured to determine the location of a SOZ in a patient's brain. Here, the algorithm(s) may process SEEG data, such as inter-ictal (high frequency oscillation (HFO) activity during resting state) (108) and/or ictal recordings (110), to determine the electrode contacts that are contributing to the SOZ, which can aid in localizing the SOZ. In exemplary embodiments, the visualization platform 100 may be capable of incorporating seizure data for overlay, which can illuminate the expanse of the seizure and how it spreads to other regions and thus help a clinician identify the SOZ. In one or more embodiments, the visualization platform 100 may further facilitate visualization of a SOZ by highlighting or otherwise graphically delineating the region of tissue in which the SOZ originates. In such a case, the highlighting or delineation may serve as a recommendation to a clinician that the given region corresponds to candidate tissue for removal in resective surgery.

In various embodiments, the visualization platform 100 may include one or more algorithms that are configured to create or generate 3D and 4D models/images based on the SEEG activity to represent the dynamics of spread of seizure activity. In one or more embodiments, the visualization platform 100 may be capable of performing multimodal image fusion so as to incorporate a variety of other data for overlay. That is, segmented electrode positions and their respective SEEG data may be combined with multimodal imaging data (e.g., from MRI and/or other sources) to demonstrate soft tissue structure and function.

In some embodiments, the visualization platform 100 may include one or more algorithms that are configured to segment (106) tissue types and provide overlay data relating to the segmented types. For instance, the algorithm(s) may identify gray matter, white matter, cerebral spinal fluid, and/or skull structure from MRI data, blood vessels from contrast enhanced scans, fiber tracks from functional MRI (fMRI) data or diffusion tensor imaging (DTI), and/or the like, and provide overlay data for some or all of these identified structures. This can, for example, aid a surgeon in avoiding functional locations of a patient's brain or critical communication tracks of the brain when planning a surgery.

In exemplary embodiments, the visualization platform 100 may present the multimodal image fusion in VR for user consumption and usage. In certain embodiments, one or more algorithm(s) of the visualization platform 100 may dynamically color/shade electrodes according to their detected SEEG activity such that a user can observe that activity coincident with the spatial structure of the brain.

The visualization platform 100 may be capable of outputting images in a VR compatible format for viewing. For instance, the visualization platform 100 may be capable of outputting final model data in the form of stereolithographic files (e.g., STL files) all generated in a common space for export to a VR viewer. For dynamic 4D images (where a 3D model may be animated), the visual appearance of 3D electrode objects may be dynamically altered (e.g., via shading, color changes, or changes to the electrode's size) to illustrate actual seizure activity over time.

In this way, embodiments of the visualization platform 100 can provide neurosurgeons with precise, patient-specific viewing of seizure data, which facilitates presurgical planning for resection surgery. By automatically computationally extracting information from imaging and SEEG activity, calculating the seizure onset zone, constructing a 3D/4D model, and providing VR visualizations, the visualization platform 100 provides a self-contained, easy to use, program that requires minimal to no user intervention and aids surgeons in determining the seizure onset zone more effectively.

In various embodiments, DTI data, which show the actual fiber bundles and the directions that they are aligned in (based on tracking of the direction of water diffusion in neurons), may be included in MRI scan(s) and registered into the CT space, and thus can be included for representation in the same VR space. In one or more embodiments, Fractional Anisotropy (FA) measurement(s) or map(s) may be derived from DTI data that illustrate how directed the fibers are at each 3D voxel of the brain (essentially providing a general mask of the fibers). This mapping may be overlaid into the VR space to represent the fiber bundles in white matter. Since a seizure may propagate along or adjacent to particular fiber tracks, presenting such information as an additional overlay in the VR space can provide a clear 4D visualization of a seizure relative to these tracks. In certain embodiments, the visualization platform 100 may be configured to present (e.g., only) certain major fiber pathways in the white matter (rather than every single fiber track) that are adjacent to seizure locations so as to highlight these as relevant fiber tracks. Selection of certain fiber tracks to display or highlight may be based on one or more criteria, such as, for instance, distance measurements between fiber tracks and determined seizure-related electrode contacts that satisfy certain threshold(s)) or the like. FIGS. 1F and 1G are example side and top down views, respectively, of white matter of a brain overlaid with some FA mapping from DTI data (that has been aligned with MRI data), illustrating the major fiber track(s) by which a seizure may propagate.

The following is a brief description of a demonstration that employed embodiment(s) of the visualization platform 100. In a study relating to six patients who underwent evaluation for DRE, SEEG data from the patients were analyzed. All patients underwent preoperative MRI and post-implant CT. SEEG data was recorded using SEEG electrodes sampled at 512 Hz. First, the MRI was co-registered to the post-implant CT. The SEEG sensors were then segmented from the CT image by applying image erosion and thresholding, and the voxels were grouped into sensors by treating them as point clouds. The identified sensors were then mapped to SEEG channels based on the naming convention used during implantation. Next, ictal SEEG segments were selected based on epileptologist annotations and sleep interictal segments that were sufficiently far from seizures. For both ictal and interictal segments, a notch filter was applied to remove powerline noise and a bandpass filter was used to extract activity in a ripple band (80 Hz to 250 Hz). An HFO detector was used to identify putative HFO rates (events/minute) in the interictal segments. A whole brain source model was created using a 5 mm grid and dipole activations were computed as weighted summations of ictal action potentials and HFO rates of nearby SEEG sensors. The weights were based on sensor proximity. The ictal and interictal candidate locations were then compared against clinically determined areas of resection (i.e., gold-standard seizure foci).

Figure 1C:
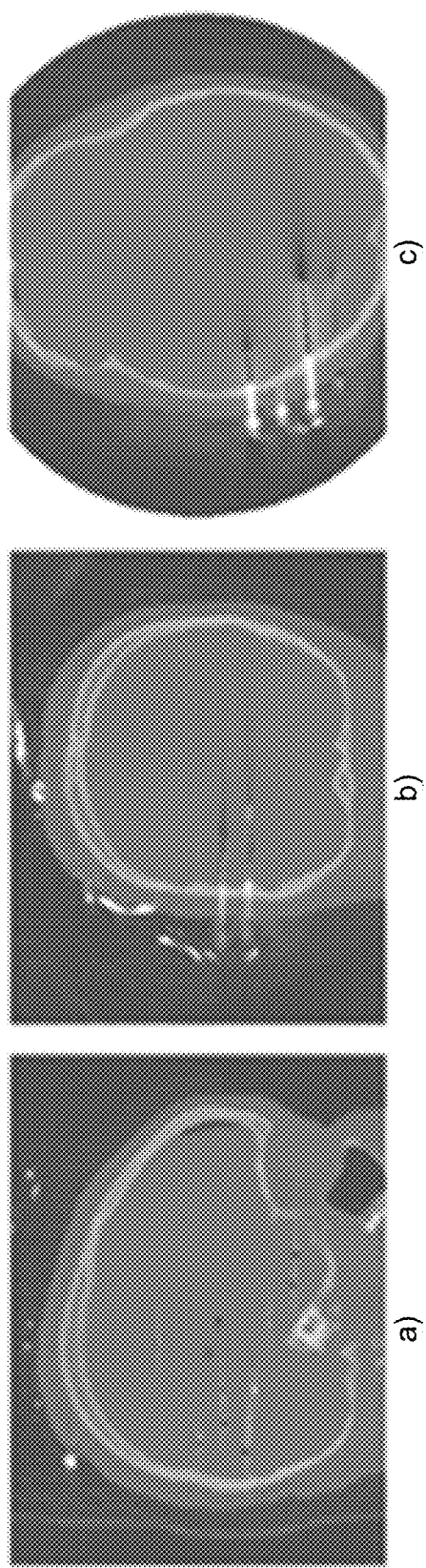
FIG. 1C illustrates results provided by an example visualization platform based on a patient's data, in accordance with various aspects described herein.

FIG. 1C illustrates results provided by an example visualization platform based on a patient's data, in accordance with various aspects described herein. In particular, FIG. 1C shows results of a segmentation algorithm (i.e., the segmented sensors) overlayed on a CT image.

Figure 1D:
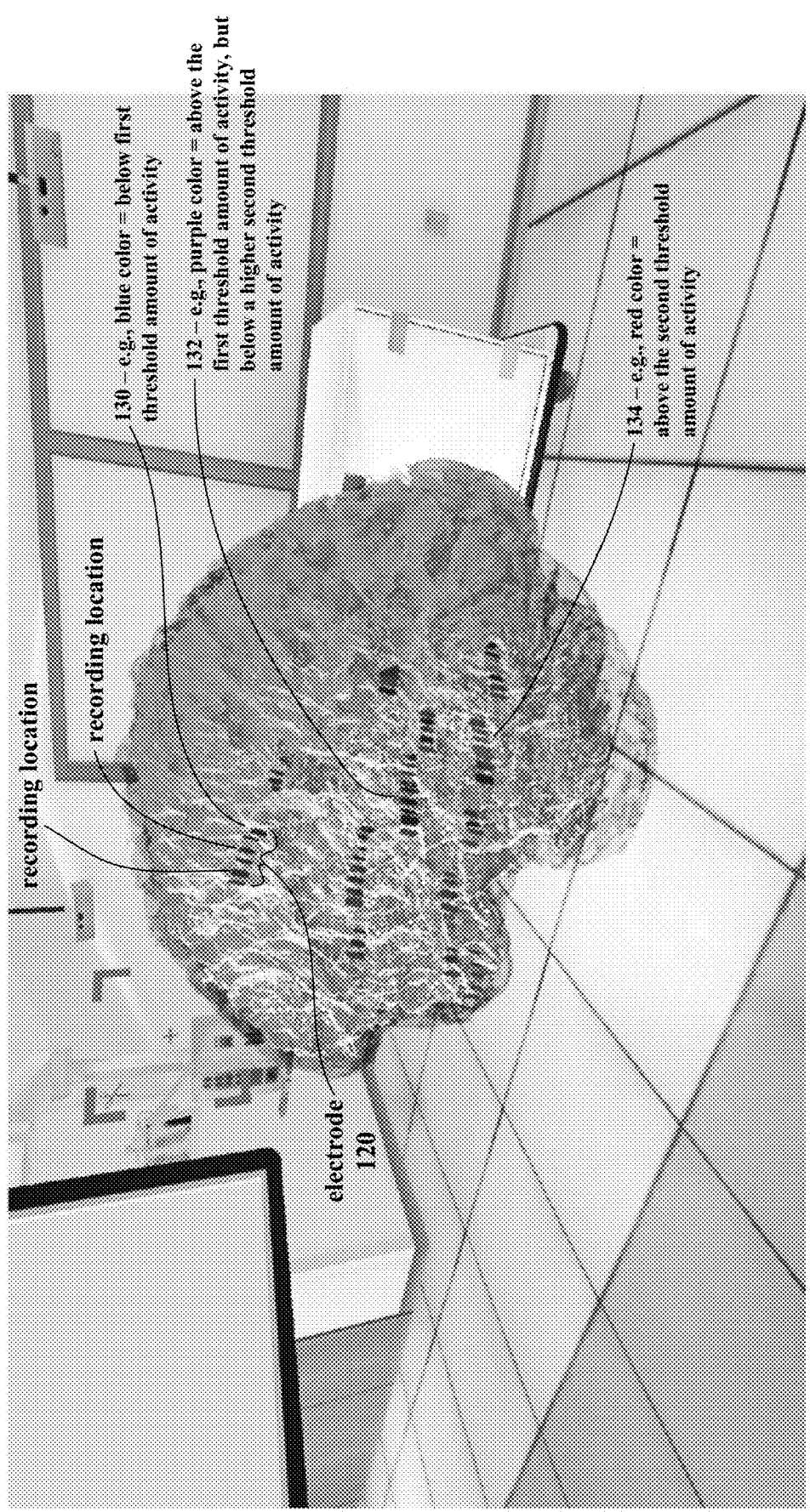
FIG. 1D shows an example model provided in a virtual reality (VR) environment by embodiments of the visualization platform, in accordance with various aspects described herein.

FIG. 1D shows an example model provided in a VR environment by embodiments of the visualization platform, in accordance with various aspects described herein. The created model provides a greater spatial understanding of SEEG electrodes (120) and the electrical energy at each SEEG electrode. For instance, at a resting state, FIG. 1D illustrates the differential activity in the SOZ. Processing of this activity data aids in localizing HFO activity. In certain embodiments, the virtualization platform 100 may color code HFO activity—e.g., where one color 130, such as a blue color, may indicate no HFO activity or HFO activity that is below a first threshold; where another color 132, such as a purple color, may indicate some HFO activity (such as activity above the first threshold but below a second threshold); and where yet another color 134, such as a red color, may indicate a lot of HFO activity (such as activity above the second threshold), such as that associated with an SOZ.

The aforementioned demonstration using SEEG data from six DRE patients illustrates that automated visualization of SEEG activity on a 3D model enhances the identification of seizure foci and subsequent surgical planning. That is, the creation of 3D and/or 4D images based on combined MRI, CT, and SEEG data enables a more complete view of the surgical case.

It is to be understood and appreciated that, while the visualization platform 100 has been described in the context of epileptic seizures, embodiments/variations of the visualization platform 100 may additionally or alternatively be employed in other contexts, such as other medical or non-medical contexts.

Figure 1E:
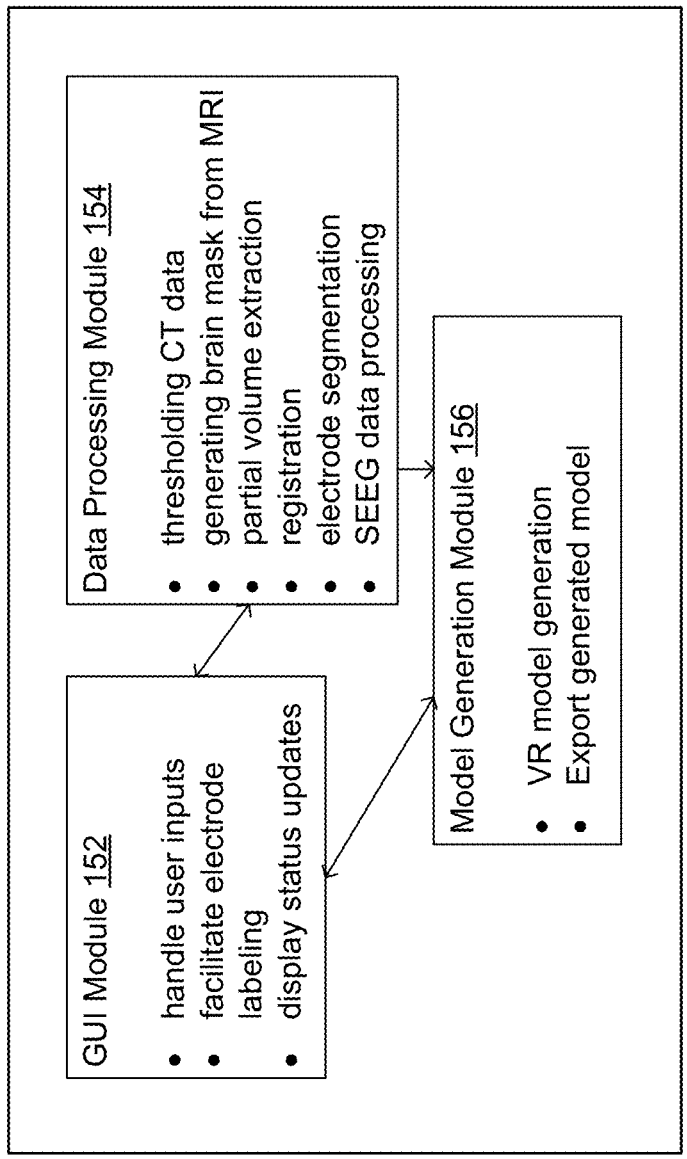
FIG. 1E shows an example, non-limiting system and example, non-limiting module functions in accordance with various aspects described herein.
Figure 1F:
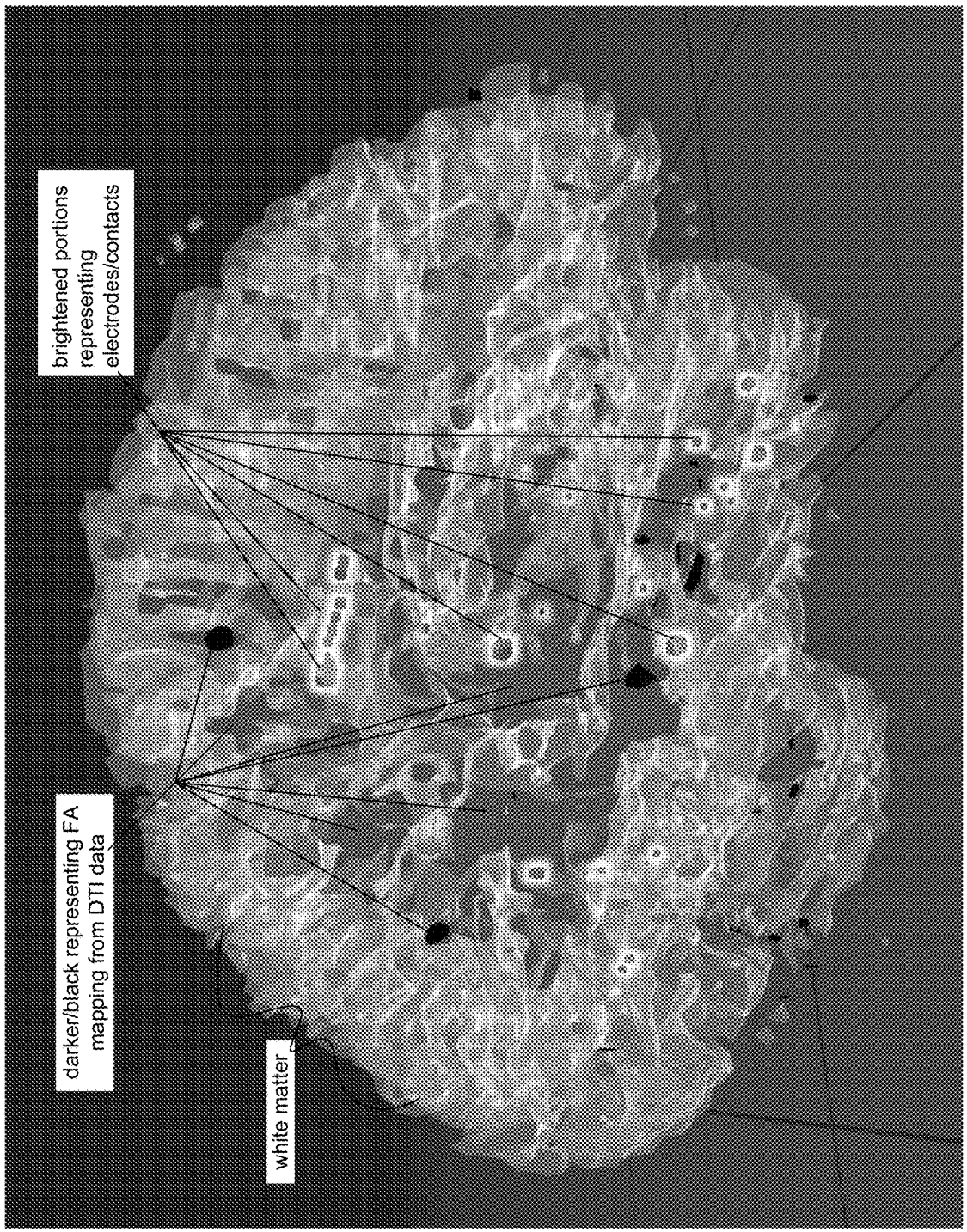
FIGS. 1F and 1G are example side and top down views, respectively, of white matter of a brain overlaid with a Fractional Anisotropy (FA) mapping from diffusion tensor imaging (DTI) data, illustrating the major fiber track(s) by which a seizure may propagate.
Figure 1G:
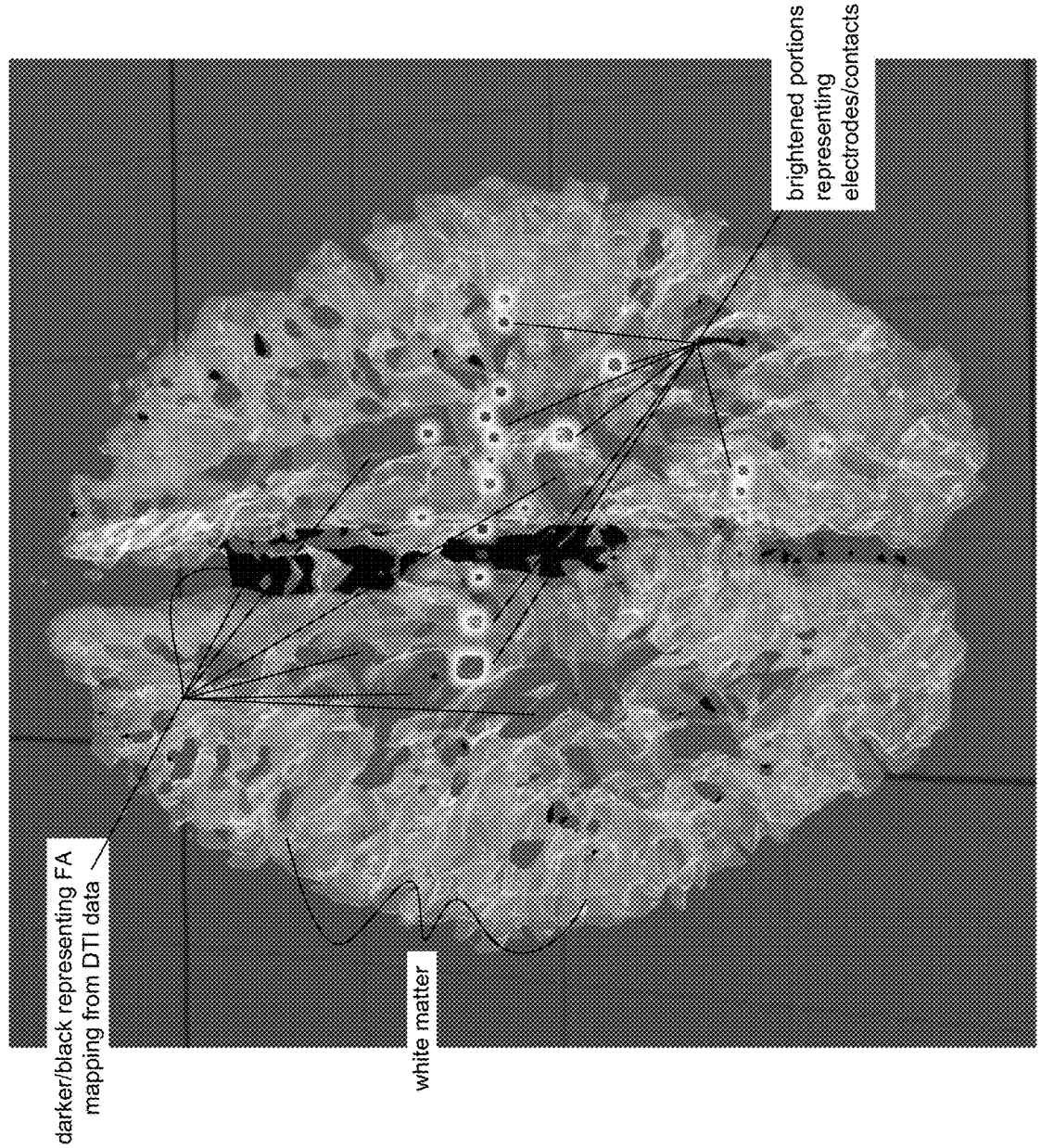

FIG. 1E shows an example, non-limiting system 150 and example, non-limiting module functions in accordance with various aspects described herein. The system 150 may relate to, be an implementation of, or otherwise correspond to the visualization platform 100 of FIG. 1A. In exemplary embodiments, the system 150 may facilitate automated diagnosis and 3D visualization of seizure onset zones based on sEEG, MRI, and CT clinical data. In various embodiments, the system 150 may facilitate 4D visualization of SEEG data, and more specifically propagation of seizure activity. Particularly, the system 150 may merge and present pre-implant MRI, post-implant CT, and SEEG data in a 3D VR environment with time series data mapped onto the electrodes. By displaying the time series data (4D) on the electrode contacts in VR, neurosurgeons can easily view data that they are already familiar with in a different environment. A neurosurgeon can, for instance, virtually slice through the planes of the brain tissue and see exactly where electrodes are in the patient and make surgical plans accordingly. Shifting mental burden from working memory to long term memory is a proven differentiator between novice and expert surgeons. Additionally, VR has been shown to be effective at aiding in the clinical understanding of the surgical case during presurgical planning.

As shown in FIG. 1E, the system 150 may include a GUI module 152, a data processing module 154, and a model generation module 156. In exemplary embodiments, the GUI module 152 may provide a visual interface (e.g., FIG. 1B or the like) that allows users to interact with the components of the system 150 (by inputting user preferences and/or inputs) and view information. The GUI may be implemented using any suitable programming language, such as Python or the like. The data processing module 154 may be configured to perform neuroimaging processing and the model generation module 156 may be configured to generate VR-ready models (described in more detail below).

In various embodiments, the data processing module 154 and the model generation module 156 may be implemented in one or more containers (e.g., individual containers). A containerized implementation may involve a physical server and an operating system thereof that are abstracted using one or more container runtime systems. Each container runtime system may be controlled to instantiate one or more containers (each with a container runtime interface that interacts with the operating system via the container runtime system). In exemplary embodiments, the data processing module 154 and the model generation module 156 may be interconnected with one another, with connections handled by the GUI module 152. Users of the system 150 may, for instance, only need to install a package (e.g., a Docker) of libraries, dependencies, settings, etc. of the system 150 to begin using the system. Containerization of critical software components enables easier setup and installation on existing systems, as the containers do not interfere with pre-installed software. It will be understood and appreciated, however, that non-container-based implementations of the system 150 are also possible.

In various embodiments, the GUI module 152 may facilitate handling of user inputs, electrode labeling, and display status updates. A user may select Neuroimaging Informatics Technology Initiative (NIFTI) files, or files of other similar file types, containing pre-implantation MRI data and post-implantation CT data. A user may also select European Data Format (EDF) files, or files of other similar file types, containing SEEG data. Selected files may be provided to the data processing module 154. Once the files are processed by the data processing module 154, a user may label the electrodes as desired. Contacts may be assigned a numerical value from the innermost toward the outermost and associated with the user-provided labels. Automated labeling of electrodes may alternatively be done according to a default template if desired. User preferences, such as bandpass filter design, animation type, seizure start flag, and/or the like can be adjusted via the GUI module 152.

In one or more embodiments, the data processing module 154 may process the MRI and CT files to extract the electrode contact positions, and generate 3D object files of the gray matter, white matter, cerebral spinal fluid, and/or electrode contacts. The data processing module 154 may also process the SEEG data to create filtered, time series data for the model generation module 156. In various embodiments, the model generation module 156 may combine the object files, the time series data, and user preferences to generate a VR-ready 4D model.

In one or more embodiments, the data processing module 154 may perform neuroimaging processing by first thresholding the CT data (e.g., to zero (0)) so as to strip out background data. This process may involve multiple iterations of thresholding and filtering operations. In various embodiments, the data processing module 154 may then utilize a tool to generate a brain mask based on the MRI data. As an example, the data processing module 154 may utilize the Brain Extraction Tool described in Steven M. Smith, "Fast robust automated brain extraction," Human Brain Mapping, 17(3), pp. 143-155, November 2002, which is incorporated by reference herein in its entirety. Of course, one or more other tools may additionally, or alternatively, be used to generate brain mask(s). In one or more embodiments, the data processing module 154 may then utilize a tool to perform partial volume extraction. As an example, the data processing module 154 may utilize the Functional MRI of the Brain (FMRIB) Software Library (FSL)'s FMRIB Automated Segmentation Tool (FAST) described in Zhang, Y., et al., "Segmentation of brain MR images through a hidden Markov random field model and the expectation-maximization algorithm," IEEE Trans Med Imaging 20(1): 45-57, 2001, which is incorporated by reference herein in its entirety. Of course, one or more other tools may additionally, or alternatively, be used to perform partial volume extraction. In various embodiments, the data processing module 154 may erode the MRI mask multiple times (e.g., three times) such that, as it is registered to the CT, there is minimal to no skull left (e.g., less than a threshold amount of skull left) on the resulting registration. In one or more embodiments, the data processing module 154 may utilize a tool to perform the registration using a nearest neighbor interpolation method. As an example, the data processing module 154 may utilize the FSL FMRIB Linear Image Registration Tool (FLIRT) described in one or more of Mark Jenkinson et al., "A global optimisation method for robust affine registration of brain images," Medical Image Analysis, Volume 5, Issue 2, 2001, Pages 143-156 and Mark Jenkinson et al., "Improved optimization for the robust and accurate linear registration and motion correction of brain images," Neuroimage Oct 2002, Volume 17(2), Pages 825-41, each of which is incorporated by reference herein in its entirety. Of course, one or more other tools may additionally, or alternatively, be used to perform registration. In one or more embodiments, partial volumes may also be registered to the CT space to align all of the images before all of the images are converted into a 1×1×1 millimeter (mm) isometric space. SEEG contacts on the CT images may be isolated from the skull by first applying the registered brain mask, followed by a threshold (e.g., at the $99.5^{th}$ percentile). It has been determined that the chosen threshold of $99.5^{th}$ percentile removes most noise, skull and scanner artifacts, and some contact blur without deleting the electrode contacts; of course, other threshold(s) may alternatively be used.

With the contacts isolated, the data processing module 154 may identify or find the positions of the contacts in space. A representative electrode may be created that is a 3×3×3 mm isometric voxel cube. Voxels may be classified into contacts via a "bubbling out" approach comparable to a depth first search for neighboring voxels to join into a coherent contact (described in more detail below). Electrode contacts may then be recursively eroded until they are smaller than or the same size as the representative. Electrode contacts can blur together due to scanner artifacts and orientation of electrodes in the scanner, so an individualized erosion method may be used to separate the contacts and preserve spatial location of the contacts. Contact midpoints may be saved and used to label them and orient them in space. Electrodes may be built from the midpoints of contacts. The distance between midpoints may be computed, and if they are within a threshold distance (e.g., 5 mm away from one another), they may be classified as part of the same electrode. Electrodes may be manually labelled via user input to the GUI module 152. Contact numbering may be done automatically. The center of the brain may be computed and contacts along an electrode may be labelled innermost to outermost (e.g. A1 may be electrode A contact 1 and would be the electrode at the end of the electrode) following a desired naming convention. Accuracy of the automated electrode identification by the data processing module 154 was evaluated using a manual rater according to a clinical workflow. Here, for validation, an engineer was trained to use a tool (i.e., 3D Slicer) to segment the electrodes from the image to identify the recording locations. The manually segmented electrodes were then processed to find the center of mass of each electrode, and this center was compared to the corresponding center determined by the automated electrode identification procedure described above.

In various embodiments, the data processing module 154 may utilize a tool to perform signal processing on the SEEG data. As an example, the data processing module 154 may utilize magnetoencephalography (MEG) and electroencephalography (EEG) (MNE)-Python described in Alexandre Gramfort et al., "MEG and EEG data analysis with MNE-Python," Frontiers in Neuroscience, 7(267), pp. 1-13, 2013, which is incorporated by reference herein in its entirety. Of course, one or more other tools may additionally, or alternatively, be used to process SEEG data. In one or more embodiments, the GUI module 152 may provide a dropdown box (or other visual object) that is populated with the event flags (or seizure start points) in the SEEG data. In some cases, the dropdown box or visual object may contain all flags present in the SEEG data—e.g., even those not related to seizure activity, so it may be important that the flag belonging to the electrical activity of interest is selected. In some embodiments, events may be clinically marked as seizure start flags. In certain embodiments, the SEEG data file may be cropped around the seizure event with some buffer time (e.g., two seconds on either side of the event, with a four second clip in total). Data may be notch filtered to remove power line noise and then any bandpass filters that are chosen may also be applied. In some embodiments, an 80 Hz to 250 Hz Butterworth filter or the like may (e.g., by default) be used, as this filter is commonly used to identify high-frequency oscillations for seizure onset zone localization. The SEEG data may then be saved out into a data structure (e.g., a spreadsheet or the like) to be passed to the model generation module 156.

With the SEEG contacts segmented, named, and labelled, and coupled with corresponding electrical data, the model generation module 156 may then generate VR model(s). In various embodiments, the model generation module 156 may utilize a tool to generate the model(s). For instance, the model generation module 156 may utilize a 3D computer graphics software tool, such as Blender or the like. The tool may have certain scripting capabilities (e.g., Python scripting capabilities), and may include one or more render engines and one or more associated algorithms for computations and production of visuals.

In various embodiments, the model generation module 156 may first convert data regarding SEEG contacts, gray matter, white matter, and/or cerebral spinal fluid into object files. For instance, the model generation module 156 may utilize Scikit-Image's implementation of the Lewiner Marching Cubes algorithm, described in Stéfan van der Walt et al., "scikit-image: Image processing in Python," PeerJ (2014) and Thomas Lewiner et al., "Efficient implementation of Marching Cubes' cases with topological guarantees," Journal of Graphics Tools 8(2) pp. 1-15 (December 2003), each of which is incorporated by reference herein in its entirety.

All of the object files may then be automatically loaded into the 3D drawing tool. In a case where Blender is used as the 3D drawing tool, default Blender scene objects, Cube, Light, and Camera may be deleted. Blender, by default, renders at 24 frames per second, and this is also the standard framerate for cinema. In some implementations, the power over a 41.7 millisecond (ms) sliding window may be computed to match the frame rate by the following two equations, the first of which is for power computation and the second of which is for min-max scaling, where P indicates the total power at each time point, and where $P_x$ indicates the windowed power at that time point, with N being the number of time points in the window:

$$P_x = \left\| \frac{1}{N} \sum_{n=0}^{N} (x[n])^2 \right\|_2$$

$$P = \frac{(P - \min(P))}{(\max(P) - \min(P))}$$

In various embodiments, electrode contacts may be animated by scaling their size at the frame being animated. The associated power at that frame may be multiplied by a value (e.g., twenty) to make the difference in power between electrodes more apparent. This means that larger contacts have proportionally more power at that frame than smaller contacts. Once all contacts have been animated, and the brain matter has been loaded in, the model may be exported or saved out for loading into a VR system. For instance, the model may be exported as a (e.g., 4D) Filmbox (FBX) file or other storage format for storing and exchanging 3D models. A user may simply load the 4D model file (e.g., along with any files that contain the electrode surgical map, electrode recording data graphs, etc. generated by the system 150) into a VR viewing platform of choice.

In this way, the system 150 allows for automatic animation of electrical data at electrode contacts over time, such that a clinician (e.g., an epileptologist or surgeon) can easily visualize the propagation of a seizure. Using models generated by the system 150, a user may interact with the 4D object in a VR environment, including, e.g., using a timeline control object for adjusting the timeline, to see different viewing angles of the brain at different times to better understand the seizure propagation over time. FIGS. 2A to 2L are example views of a generated 4D model at different times, illustrating the onset of a seizure to spreading of the seizure activity throughout the brain as well as subsequent echoes of the seizure, in accordance with various aspects described herein. In these figures, white matter of the brain is shown, with seizure onset occurring at a time when the image in FIG. 2B was captured. A surge of activity in the electrodes then occurs over time, aligning with the surgical map shown on the left of each of these figures. For this example seizure case, a clinical team identified electrode C as the primary electrode of interest, and the seizure activity in these images reflects that.

As discussed above, current detection of seizure onset is done manually (e.g., by a nurse), which may not necessarily be accurate. In various embodiments, the system 150 may be equipped with one or more artificial intelligence (AI) algorithms (e.g., one or more machine learning (ML) algorithms) for predicting onsets (times and/or locations) of seizures and/or propagations of seizures over time. For example, in some embodiments, the system 150 may provide information regarding the onset (time and/or location) of a seizure and/or a propagation path of a seizure over time as input(s) to one or more machine learning algorithms, which may perform machine learning to automate future determinations or predictions of onsets (times and/or locations) of other seizures and/or propagations of other seizures over time. For example, the system 150 may train a machine learning algorithm based on: known inputs (e.g., electrode locations and power levels and/or changes to electrode power levels) and known outputs (e.g., determined onsets (times and/or locations) of seizures and/or determined propagation paths of seizures over time). In some embodiments, the system 150 may refine a machine learning algorithm based on feedback received from a user of the system 150 and/or from one or more other devices or systems (e.g., management device(s)/system(s)). For example, the user of the system 150 and/or one or more management devices may provide feedback indicating whether predictions of onsets (times and/or locations) of seizures and/or propagation paths of seizures, made by the machine learning algorithm based on new inputs, are accurate and/or helpful. When the feedback indicates that a particular prediction is accurate and/or helpful, the system 150 may configure the machine learning algorithm to make predictions of onsets (times and/or locations) of seizures and/or propagation paths of seizures based on the particular prediction (e.g., to predict onsets (times and/or locations) of seizures and/or propagation paths of seizures in a manner similar to that in which the particular prediction was made). When the feedback indicates that a particular prediction is not accurate or helpful, the system 150 may configure the machine learning algorithm to avoid predicting onsets (times and/or locations) of seizures and/or propagations of seizures in a manner in which the particular prediction was made. In this way, the system 150 can predict onsets (times and/or locations) of seizures and/or propagations of seizures based on a machine learning algorithm, which improves the accuracy of the predictions, and conserves processor and/or storage resources that may otherwise be used to generate and store rules for predicting onsets (times and/or locations) of seizures and/or propagations of seizures. In various embodiments, the AI or ML algorithm(s) may be configured to reduce any error in the predictions. In this way, any error that may be present may be provided as feedback to the algorithm(s), such that the error may tend to converge toward zero as the algorithm(s) are utilized more and more.

It is to be understood and appreciated that, although one or more of FIGS. 1A, 1B, and 1E might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, modules, systems, etc. may have been illustrated in one or more of FIGS. 1A, 1B, and 1E as separate components, modules, systems, etc., it will be appreciated that multiple components, modules, systems, etc. can be implemented as a single component, module, system, etc., or a single component, module, system, etc. can be implemented as multiple components, modules, systems, etc. Additionally, functions described as being performed by one component, module, system, etc. may be performed by multiple components, modules, systems, etc., or functions described as being performed by multiple components, modules, systems, etc. may be performed by a single component, module, system, etc.

Figure 2A:
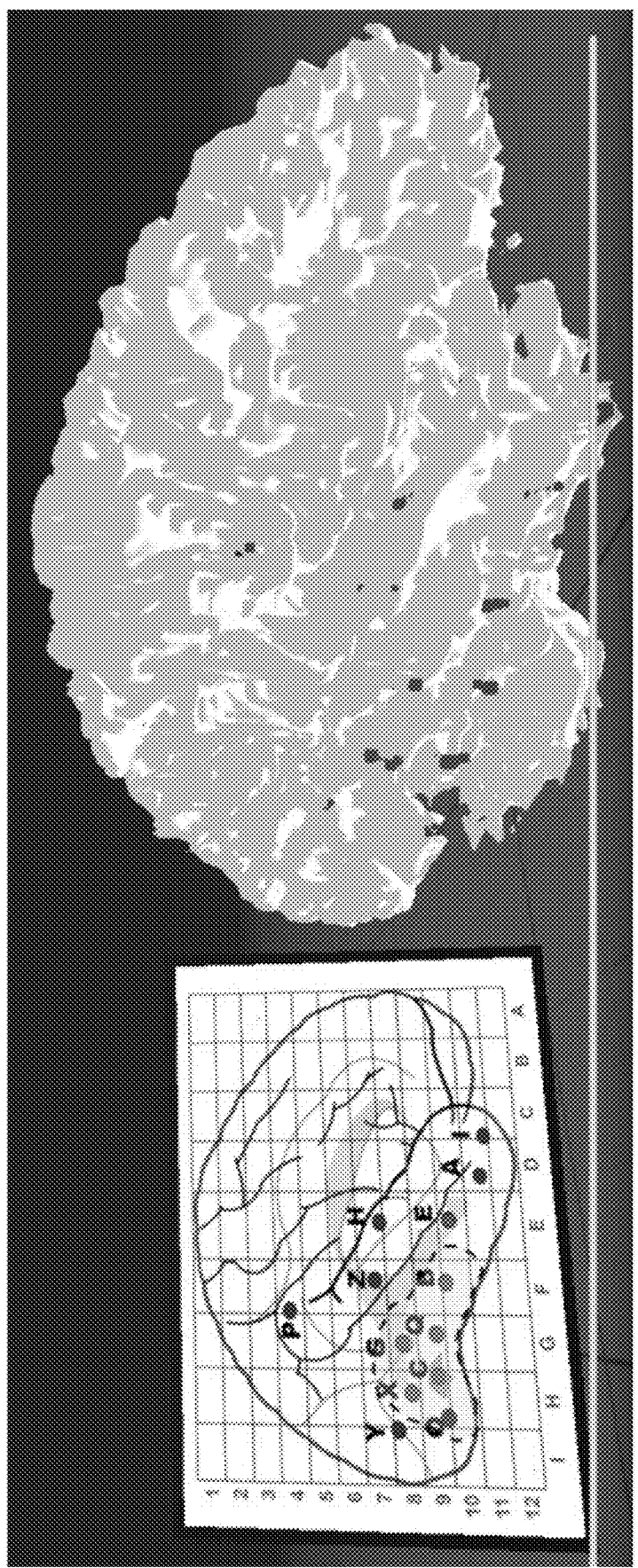
FIGS. 2A to 2L are example views of a generated four-dimensional (4D) model at different times, illustrating the onset of a seizure to spreading of the seizure activity throughout the brain as well as subsequent echoes of the seizure, in accordance with various aspects described herein.
Figure 2B:
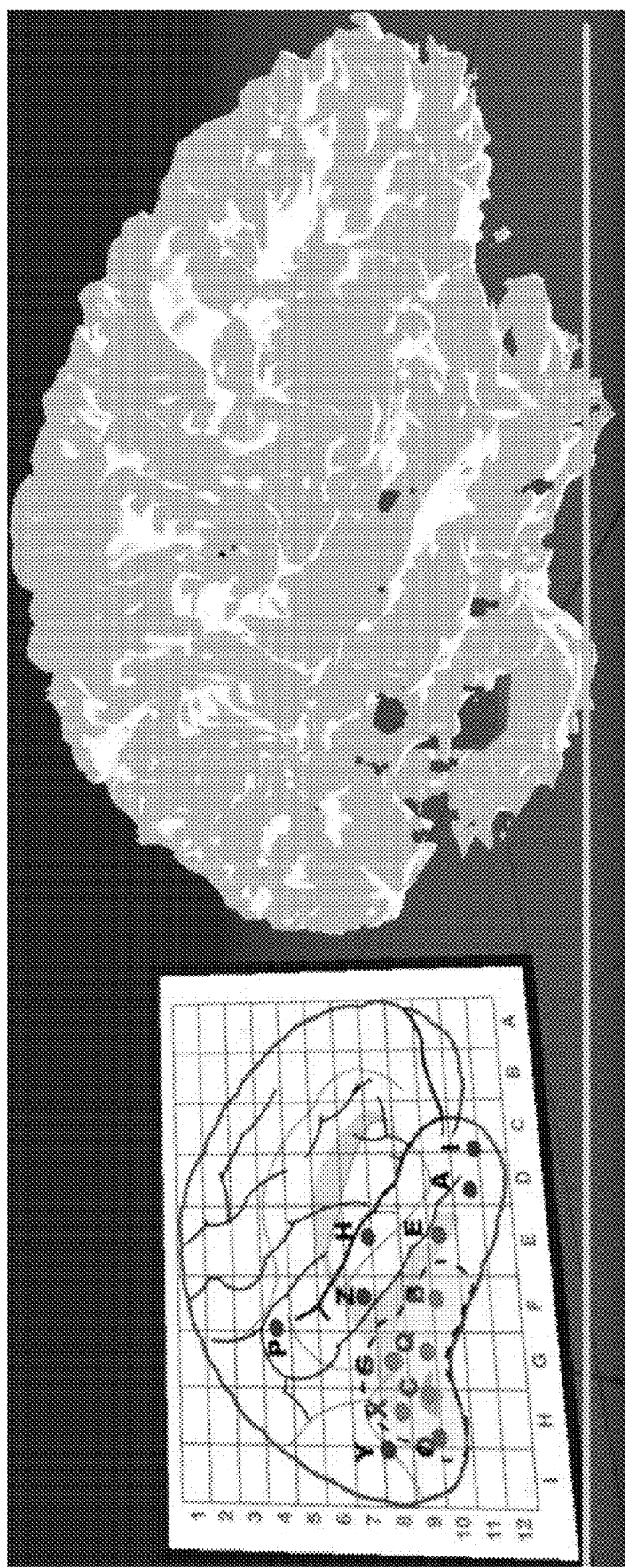
Figure 2C:
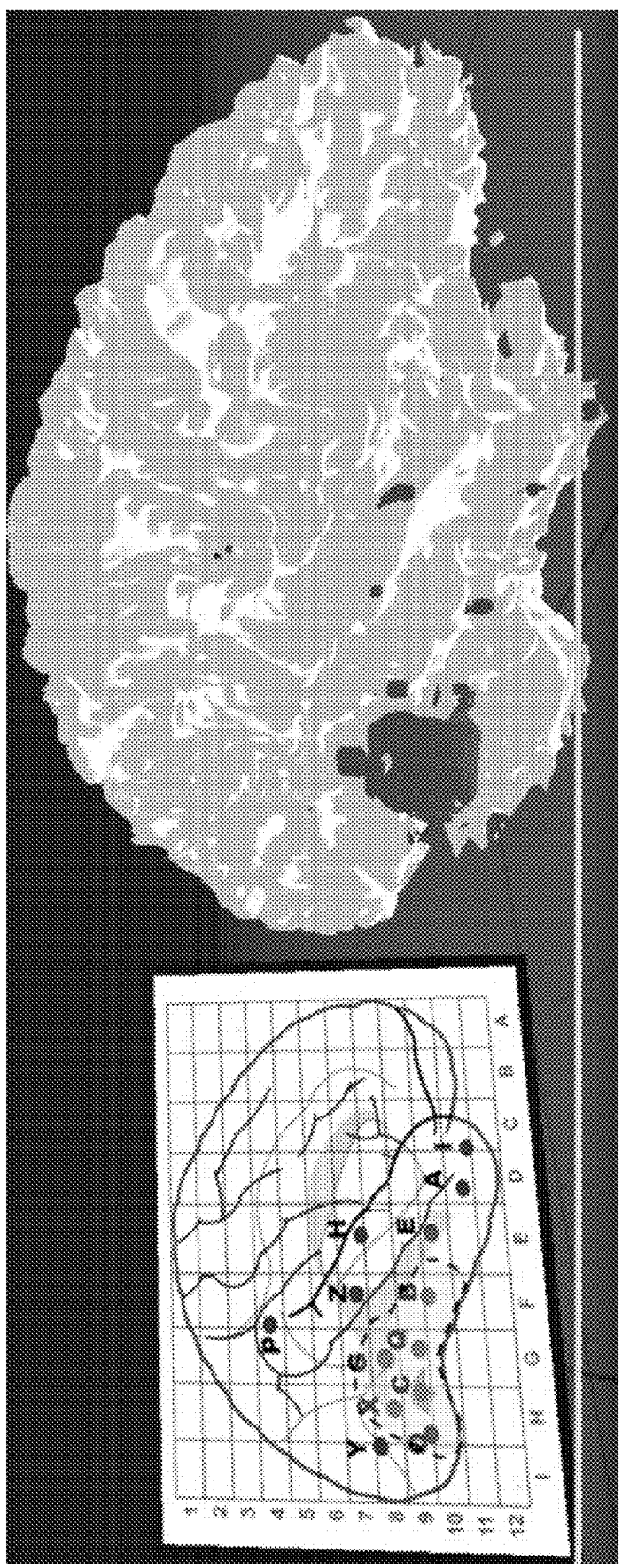
Figure 2D:
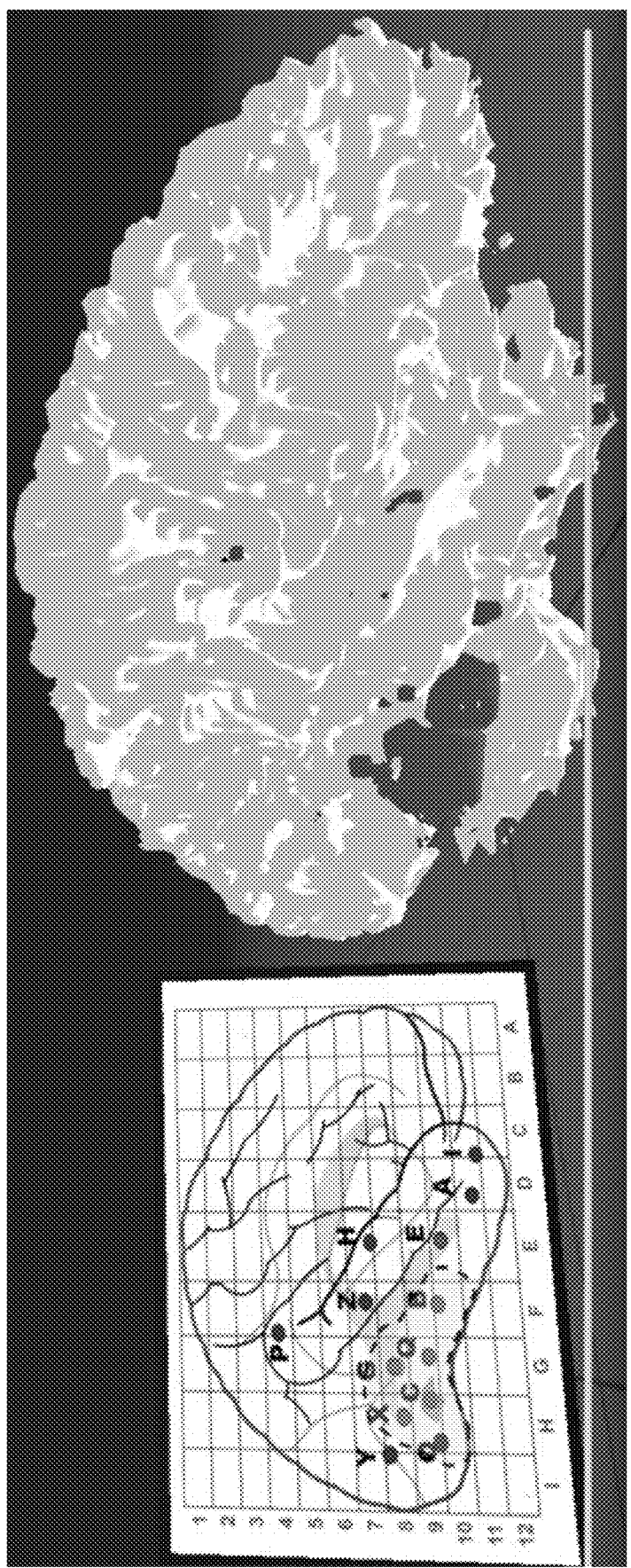
Figure 2E:
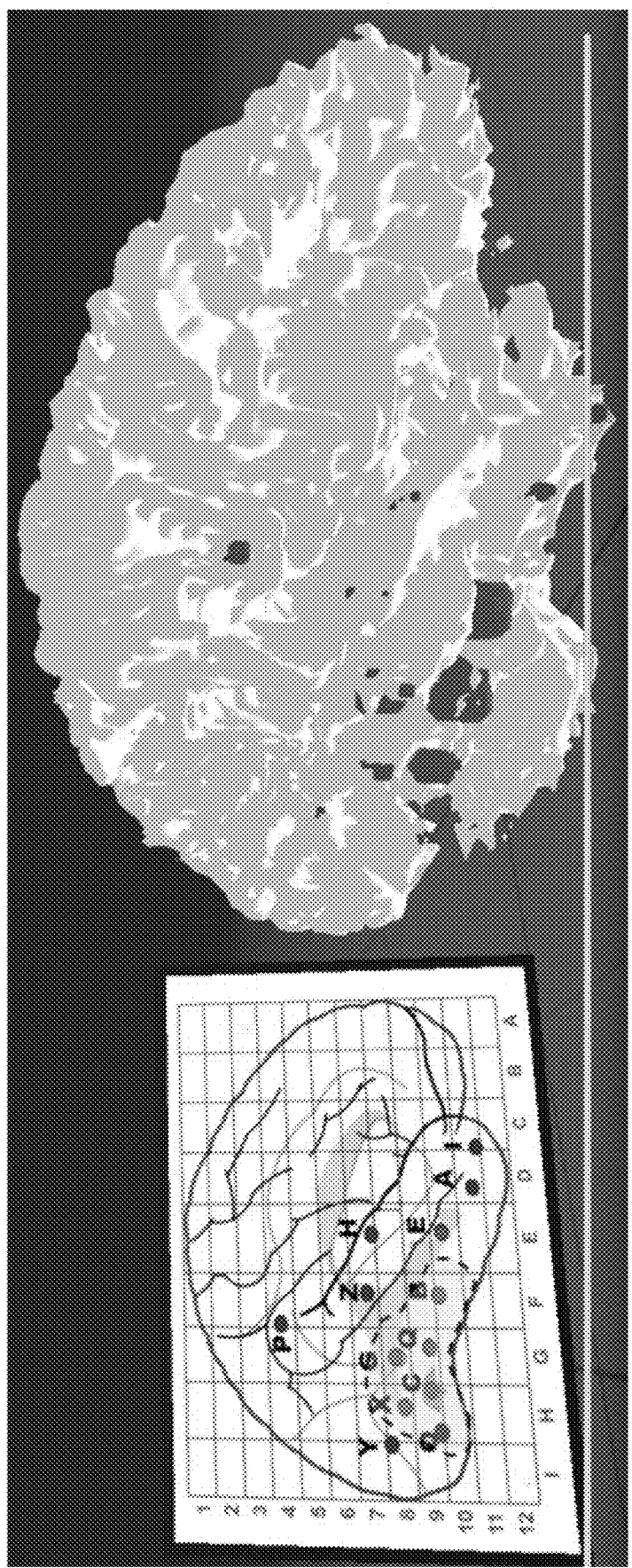
Figure 2F:
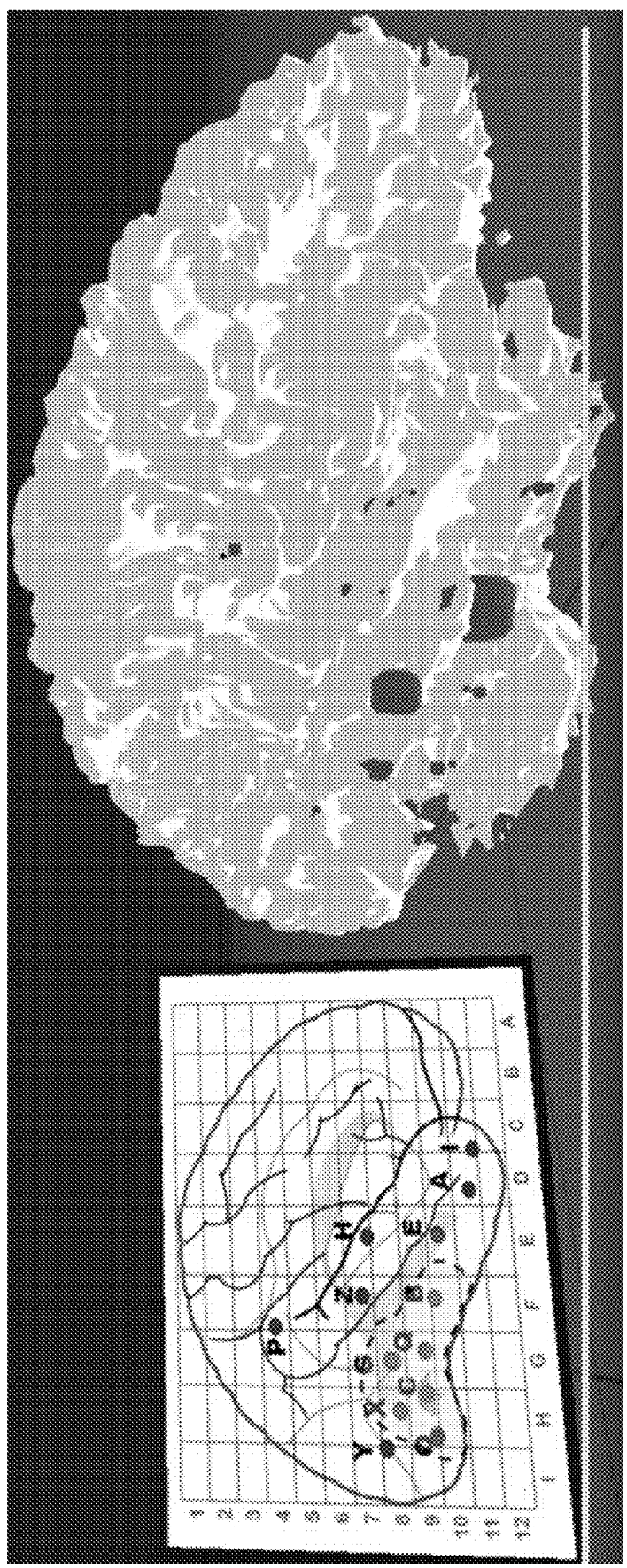
Figure 2G:
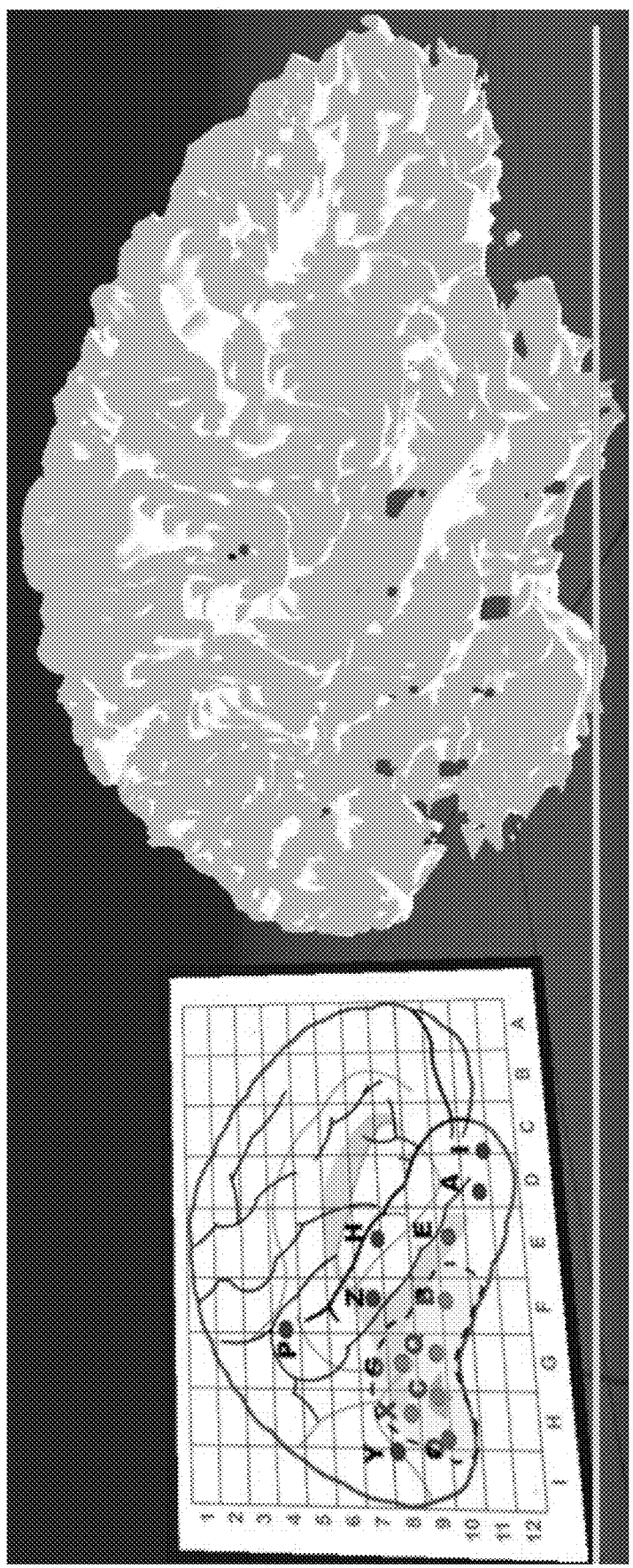
Figure 2H:
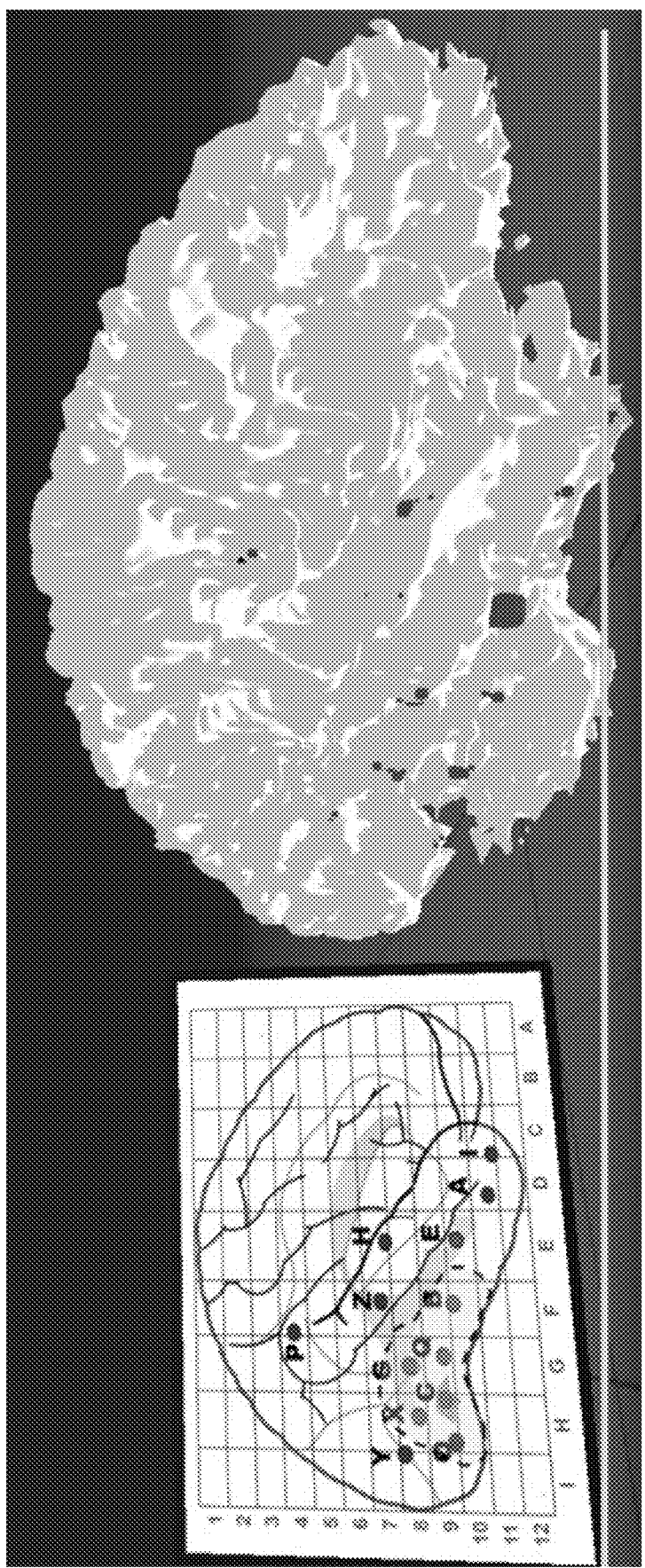
Figure 2I:
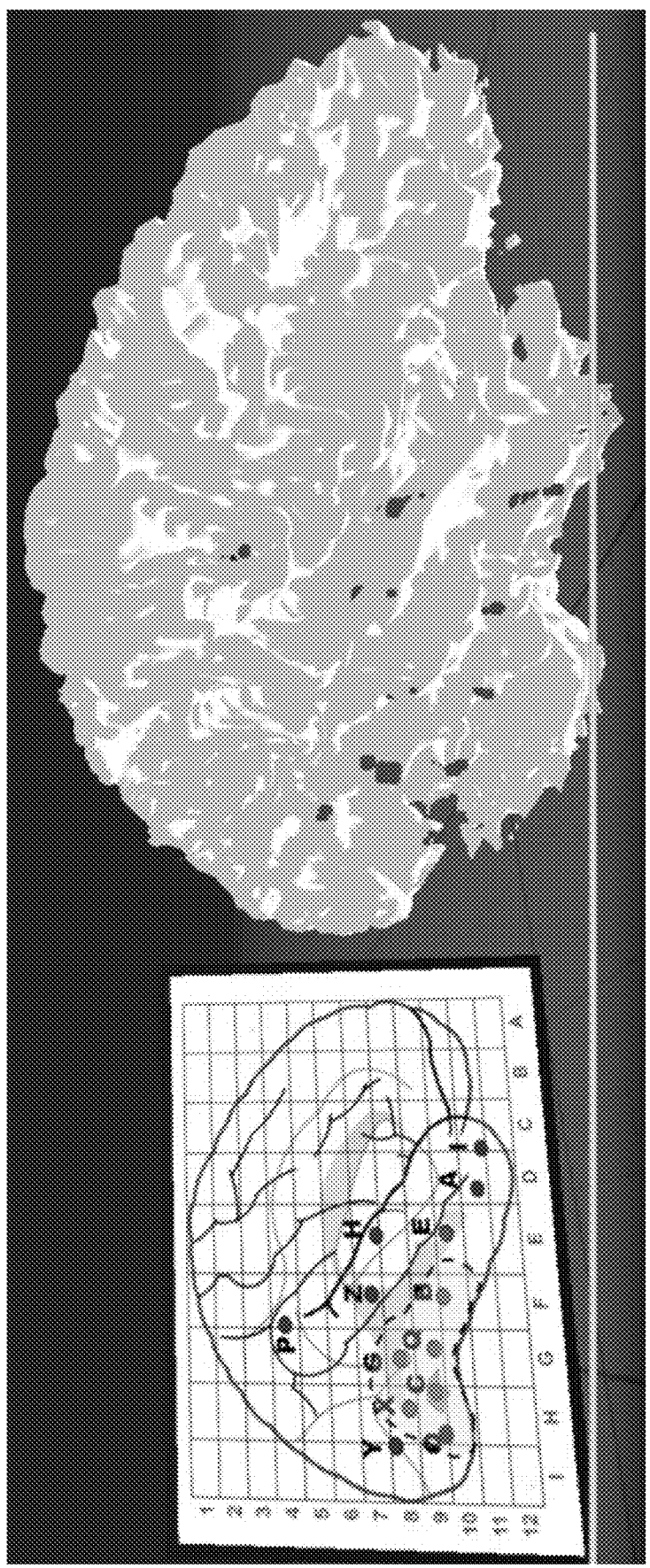
Figure 2J:
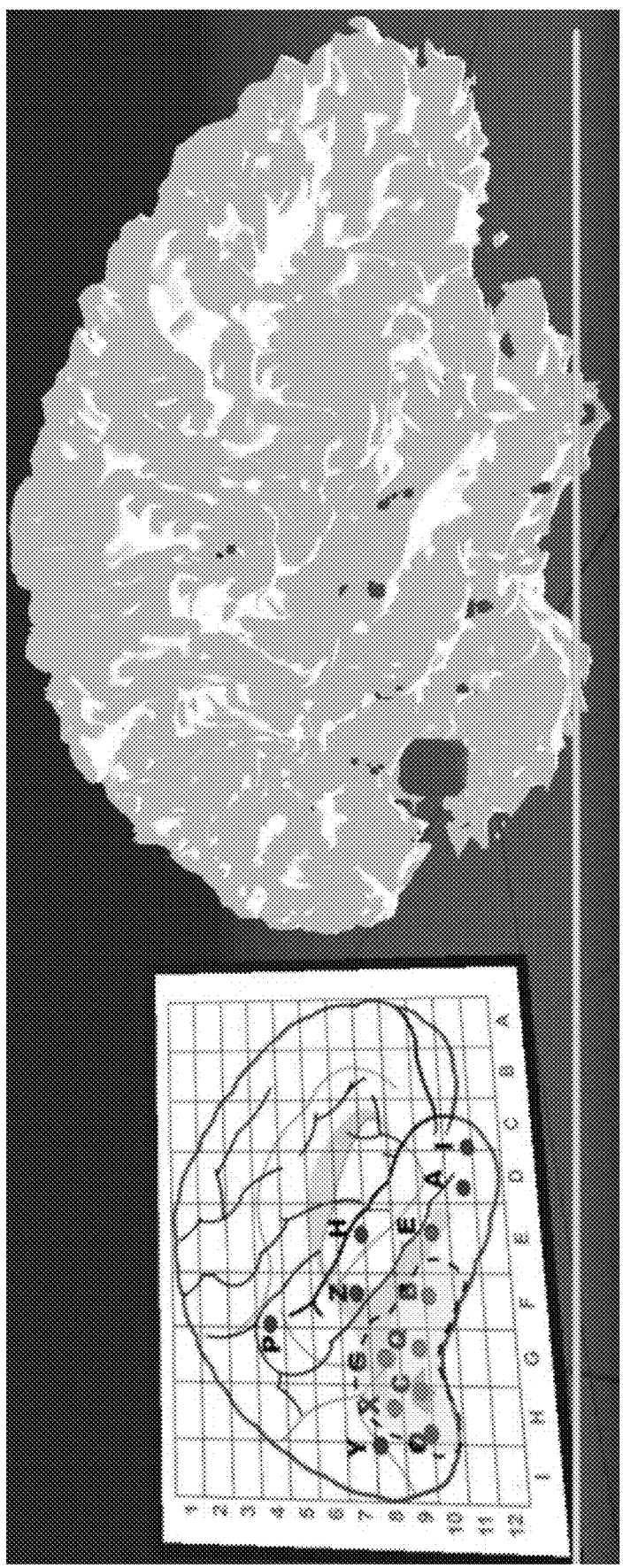
Figure 2K:
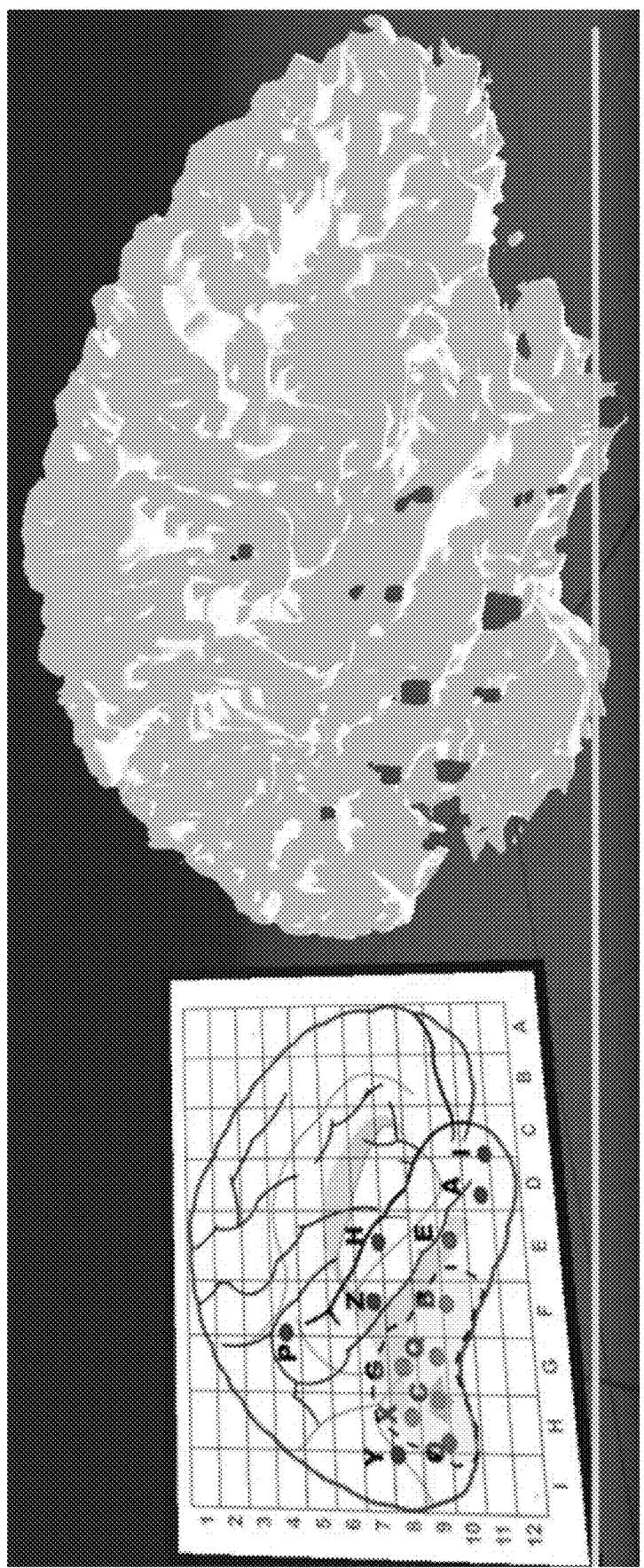
Figure 2L:
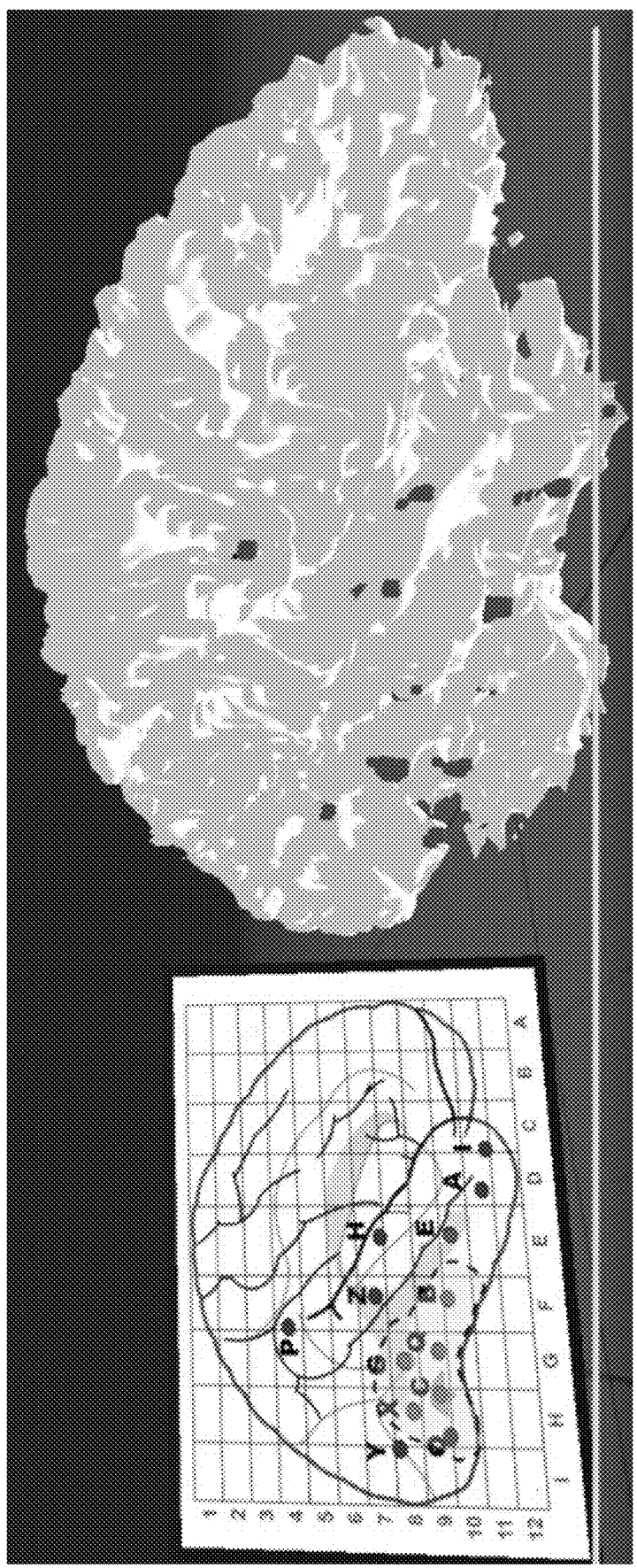
Figure 2M:
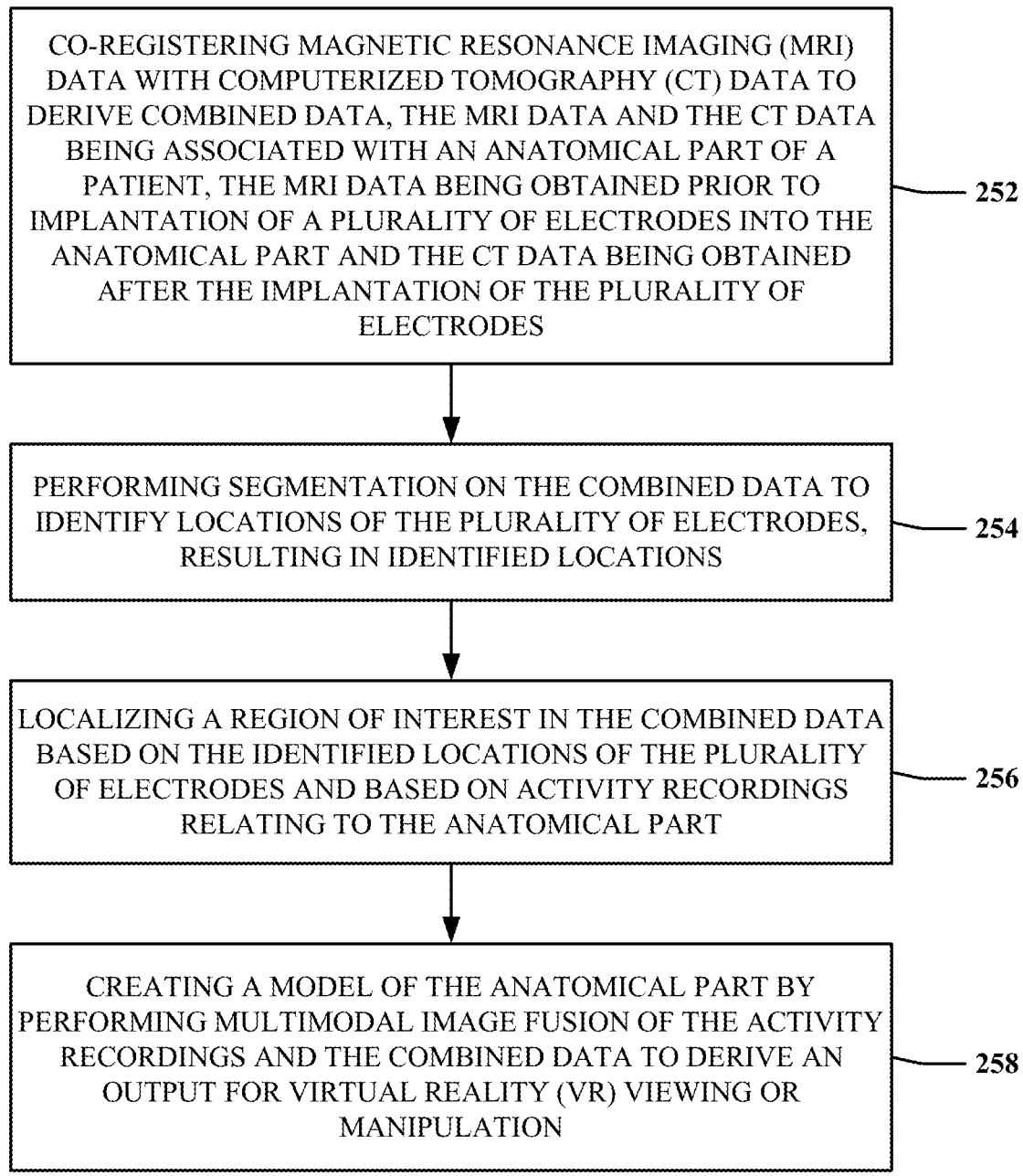
FIG. 2M depicts an illustrative embodiment of a method in accordance with various aspects described herein.

FIG. 2M depicts an illustrative embodiment of a method 250 in accordance with various aspects described herein.

At 252, the method can include co-registering magnetic resonance imaging (MRI) data with computerized tomography (CT) data to derive combined data, the MRI data and the CT data being associated with an anatomical part of a patient, the MRI data being obtained prior to implantation of a plurality of electrodes into the anatomical part and the CT data being obtained after the implantation of the plurality of electrodes. For example, the visualization platform 100 and/or the system 150 can, similar to that described above, perform one or more operations that include co-registering magnetic resonance imaging (MRI) data with computerized tomography (CT) data to derive combined data, the MRI data and the CT data being associated with an anatomical part of a patient, the MRI data being obtained prior to implantation of a plurality of electrodes into the anatomical part and the CT data being obtained after the implantation of the plurality of electrodes.

At 254, the method can include performing segmentation on the combined data to identify locations of the plurality of electrodes, resulting in identified locations. For example, the visualization platform 100 and/or the system 150 can, similar to that described above, perform one or more operations that include performing segmentation on the combined data to identify locations of the plurality of electrodes, resulting in identified locations.

At 256, the method can include localizing a region of interest in the combined data based on the identified locations of the plurality of electrodes and based on activity recordings relating to the anatomical part. For example, the visualization platform 100 and/or the system 150 can, similar to that described above, perform one or more operations that include localizing a region of interest in the combined data based on the identified locations of the plurality of electrodes and based on activity recordings relating to the anatomical part.

At 258, the method can include creating a model of the anatomical part by performing multimodal image fusion of the activity recordings and the combined data to derive an output for virtual reality (VR) viewing or manipulation. For example, the visualization platform 100 and/or the system 150 can, similar to that described above, perform one or more operations that include creating a model of the anatomical part by performing multimodal image fusion of the activity recordings and the combined data to derive an output for virtual reality (VR) viewing or manipulation.

While for purposes of simplicity of explanation, the respective processes are shown and described as a series of blocks in FIG. 2M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
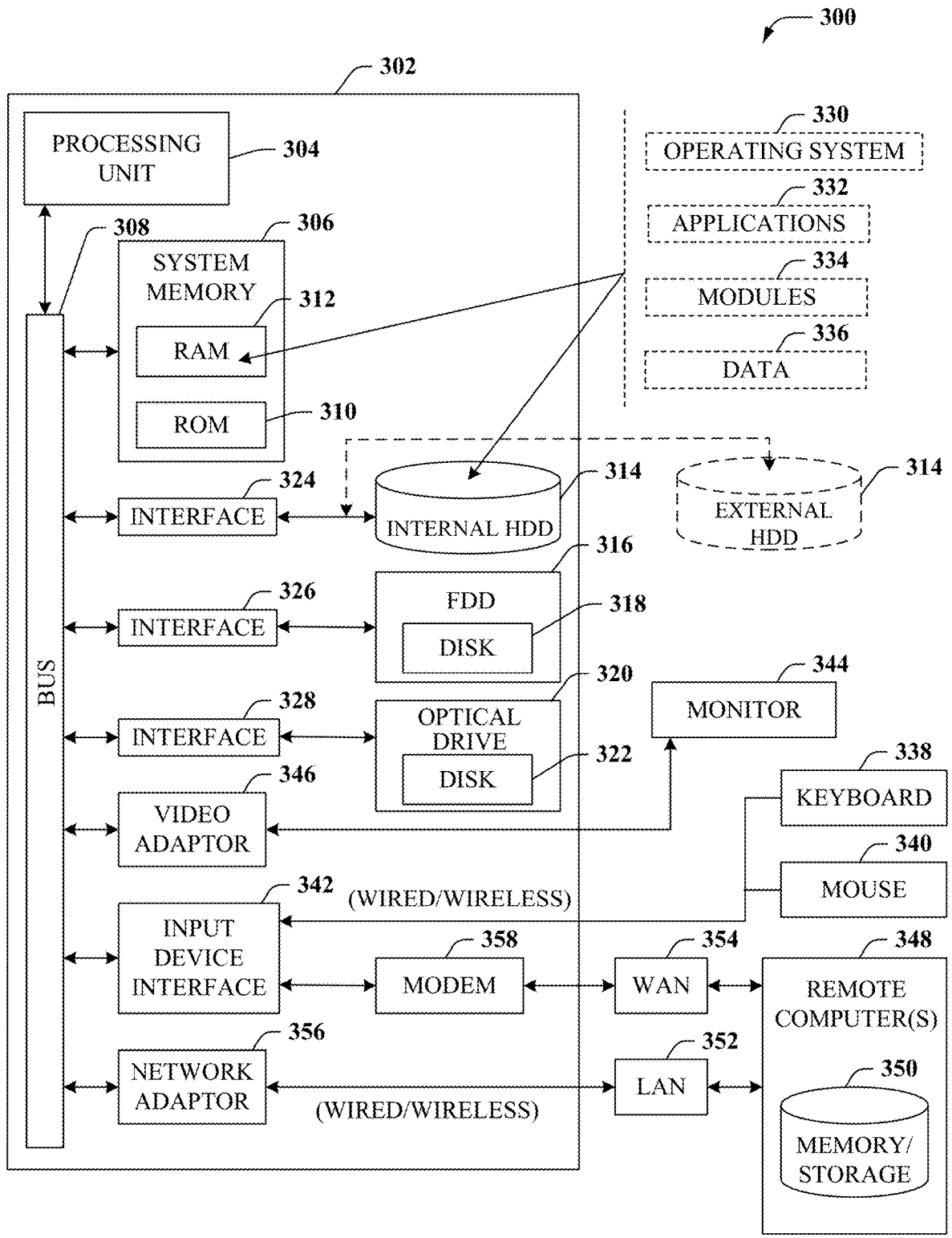
FIG. 3 is a block diagram of an example, non-limiting embodiment of a computing environment in accordance with various aspects described herein.

Turning now to FIG. 3, there is illustrated a block diagram of a computing environment in accordance with various aspects described herein. In order to provide additional context for various embodiments of the embodiments described herein, FIG. 3 and the following discussion are intended to provide a brief, general description of a suitable computing environment 300 with which various embodiments of the subject disclosure can be implemented. Various embodiments can be implemented via computer-executable instructions that can run on one or more computers, and/or in combination with other program modules and/or as a combination of hardware and software. For example, computing environment 300 can facilitate, in whole or in part, patient-customized, multimodal clinical data fusion and visualization for presurgical planning.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits, such as an application specific integrated circuit, digital logic circuit, state machine, programmable gate array, or other circuit that processes input signals or data and that produces output signals or data in response thereto. It should be noted that any functions and features described herein in association with the operation of a processor could likewise be performed by a processing circuit.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information, such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared, and other wireless media.

With reference again to FIG. 3, the example environment can comprise a computer 302, the computer 302 comprising a processing unit 304, a system memory 306 and a system bus 308. The system bus 308 couples system components including, but not limited to, the system memory 306 to the processing unit 304. The processing unit 304 can be any of various commercially available processors. Dual microprocessors and other multiprocessor architectures can also be employed as the processing unit 304.

The system bus 308 can be any of several types of bus structure that can further interconnect to a memory bus (with or without a memory controller), a peripheral bus, and a local bus using any of a variety of commercially available bus architectures. The system memory 306 comprises ROM 310 and RAM 312. A basic input/output system (BIOS) can be stored in a non-volatile memory such as ROM, erasable programmable read only memory (EPROM), EEPROM, which BIOS contains the basic routines that help to transfer information between elements within the computer 302, such as during startup. The RAM 312 can also comprise a high-speed RAM, such as static RAM for caching data.

The computer 302 further comprises an internal hard disk drive (HDD) 314 (e.g., EIDE, SATA), which internal HDD 314 can also be configured for external use in a suitable chassis (not shown), a magnetic floppy disk drive (FDD) 316 (e.g., to read from or write to a removable diskette 318), and an optical disk drive 320 (e.g., for reading a CD-ROM disk 322 or to read from or write to other high capacity optical media such as the DVD). The HDD 314, magnetic FDD 316, and optical disk drive 320 can be connected to the system bus 308 by a hard disk drive interface 324, a magnetic disk drive interface 326, and an optical drive interface 328, respectively. The hard disk drive interface 324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 312, comprising an operating system 330, one or more application programs 332, other program modules 334, and program data 336. All or portions of the operating system, applications, modules, and/or data can also be cached in the RAM 312. The systems and methods described herein can be implemented utilizing various commercially available operating systems or combinations of operating systems.

A user can enter commands and information into the computer 302 through one or more wired/wireless input devices, e.g., a keyboard 338 and a pointing device, such as a mouse 340. Other input devices (not shown) can comprise a microphone, an infrared (IR) remote control, a joystick, a game pad, a stylus pen, touch screen, or the like. These and other input devices are often connected to the processing unit 304 through an input device interface 342 that can be coupled to the system bus 308, but can be connected by other interfaces, such as a parallel port, an IEEE 1394 serial port, a game port, a universal serial bus (USB) port, an IR interface, etc.

A monitor 344 or other type of display device can be also connected to the system bus 308 via an interface, such as a video adapter 346. It will also be appreciated that in alternative embodiments, a monitor 344 can also be any display device (e.g., another computer having a display, a smart phone, a tablet computer, etc.) for receiving display information associated with computer 302 via any communication means, including via the Internet and cloud-based networks. In addition to the monitor 344, a computer typically comprises other peripheral output devices (not shown), such as speakers, printers, etc.

The computer 302 can operate in a networked environment using logical connections via wired and/or wireless communications to one or more remote computers, such as a remote computer(s) 348. The remote computer(s) 348 can be a workstation, a server computer, a router, a personal computer, portable computer, microprocessor-based entertainment appliance, a peer device, or other common network node, and typically comprises many or all of the elements described relative to the computer 302, although, for purposes of brevity, only a remote memory/storage device 350 is illustrated. The logical connections depicted comprise wired/wireless connectivity to a local area network (LAN) 352 and/or larger networks, e.g., a wide area network (WAN) 354. Such LAN and WAN networking environments are commonplace in offices and companies, and facilitate enterprise-wide computer networks, such as intranets, all of which can connect to a global communications network, e.g., the Internet.

When used in a LAN networking environment, the computer 302 can be connected to the LAN 352 through a wired and/or wireless communication network interface or adapter 356. The adapter 356 can facilitate wired or wireless communication to the LAN 352, which can also comprise a wireless AP disposed thereon for communicating with the adapter 356.

When used in a WAN networking environment, the computer 302 can comprise a modem 358 or can be connected to a communications server on the WAN 354 or has other means for establishing communications over the WAN 354, such as by way of the Internet. The modem 358, which can be internal or external and a wired or wireless device, can be connected to the system bus 308 via the input device interface 342. In a networked environment, program modules depicted relative to the computer 302, or portions thereof, can be stored in the remote memory/storage device 350. It will be appreciated that the network connections shown are examples and other means of establishing a communications link between the computers can be used.

The computer 302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from various locations, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

It is to be understood and appreciated that, although various of the drawing figures are described herein as pertaining to various processes and/or actions that are performed in a particular order, some of these processes and/or actions may occur in different orders and/or concurrently with other processes and/or actions from what is depicted/described above. Moreover, not all of these processes and/or actions may be required to implement the systems and/or methods described herein.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

Any use of the terms "first," "second," and so forth, in the claims, unless otherwise clear by context, is for clarity only and doesn't otherwise indicate or imply any order in time. For instance, "a first determination," "a second determination," and "a third determination" does not indicate or imply that the first determination is to be made before the second determination, or vice versa, etc.

While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative (rather than in a restrictive) sense.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a processing system including a processor; and
    a memory that stores executable instructions that, when executed by the processing system, facilitate performance of operations, the operations comprising:
    co-registering magnetic resonance imaging (MRI) data with computerized tomography (CT) data to derive merged data, the MRI data and the CT data being associated with an anatomical part of a patient, the MRI data being obtained prior to implantation of a plurality of electrodes into the anatomical part and the CT data being obtained after the implantation of the plurality of electrodes;
    performing segmentation on the merged data to identify locations of the plurality of electrodes, resulting in identified locations;
    localizing a region of interest in the merged data based on the identified locations of the plurality of electrodes and based on activity recordings relating to the anatomical part; and
    generating a model of the anatomical part by performing multimodal image fusion of the activity recordings and the merged data to derive an output for virtual reality (VR) viewing or manipulation.

2. The device of claim 1, wherein the performing the multimodal image fusion further includes overlaying of information from additional imaging data.

3. The device of claim 2, wherein the additional imaging data relates to gray matter, white matter, cerebral spinal fluid, skull structure, blood vessels, fiber tracks, or a combination thereof.

4. The device of claim 1, wherein the anatomical part comprises a brain, and wherein the activity recordings comprise seizure data.

5. The device of claim 1, wherein the region of interest comprises a seizure onset zone (SOZ).

6. The device of claim 1, wherein the plurality of electrodes comprises stereoelectroencephalographic (SEEG) electrodes.

7. The device of claim 1, wherein the operations further comprise receiving the MRI data.

8. The device of claim 1, wherein the operations further comprise receiving the CT data.

9. The device of claim 1, wherein the performing the segmentation comprises iterative thresholding to identify recording locations of each electrode of the plurality of electrodes.

10. The device of claim 9, wherein the performing the segmentation further comprises replacing or representing each identified electrode with a respective synthetic electrode.

11. The device of claim 1, wherein the operations further comprise facilitating, via a graphical user interface (GUI), naming or labeling of the plurality of electrodes subsequent to the segmentation.

12. The device of claim 1, wherein the operations further comprise aligning the identified locations to a common space.

13. The device of claim 1, wherein the model comprises a three-dimensional (3D) model or a four-dimensional (4D) model.

14. The device of claim 13, wherein the 4D model comprises a 3D model and time, thereby enabling animated 3D modeling.

15. A method, comprising:
    co-registering, by a processing system including a processor, magnetic resonance imaging (MRI) data with computerized tomography (CT) data to derive combined data, the MRI data and the CT data being associated with an anatomical part of a patient, the MRI data being obtained prior to implantation of a plurality of electrodes into the anatomical part and the CT data being obtained after the implantation of the plurality of electrodes;
    performing, by the processing system, segmentation on the combined data to identify locations of the plurality of electrodes, resulting in identified locations;

localizing, by the processing system, a region of interest in the combined data based on the identified locations of the plurality of electrodes and based on activity recordings relating to the anatomical part; and creating, by the processing system, a model of the anatomical part by performing multimodal image fusion of the activity recordings and the combined data to derive an output for virtual reality (VR) viewing or manipulation.

16. The method of claim 15, wherein the performing the segmentation comprises iterative erosions to identify recording locations of each electrode of the plurality of electrodes.

17. The method of claim 16, wherein the performing the segmentation further comprises grouping recording locations to their corresponding electrodes.

18. A non-transitory machine-readable medium, comprising executable instructions that, when executed by a processing system including a processor, facilitate performance of operations, the operations comprising:

merging magnetic resonance imaging (MRI) data with computerized tomography (CT) data, resulting in merged data, the MRI data and the CT data being associated with an anatomical part of a patient, the MRI data being obtained prior to implantation of a plurality of electrodes into the anatomical part and the CT data being obtained after the implantation of the plurality of electrodes;

performing segmentation on the merged data to identify locations of the plurality of electrodes, resulting in identified locations;

determining a region of interest in the merged data based on the identified locations of the plurality of electrodes and based on activity recordings relating to the anatomical part; and generating a model of the anatomical part by performing multimodal image fusion of the activity recordings and the merged data to derive an output for virtual reality (VR) viewing or manipulation.

19. The non-transitory machine-readable medium of claim 18, wherein the region of interest comprises a seizure onset zone (SOZ).

20. The non-transitory machine-readable medium of claim 19, wherein the operations further comprise causing the region of interest to be highlighted or graphically delineated so as to provide a visualization of the SOZ.

* * * * *